(12) United States Patent
Ellis

(10) Patent No.: US 10,322,417 B2
(45) Date of Patent: Jun. 18, 2019

(54) MAGNETICALLY ENHANCED PHASE SEPARATION FOR SOLVENT EXTRACTION

(71) Applicant: Ross J. Ellis, Naperville, IL (US)

(72) Inventor: Ross J. Ellis, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 234 days.

(21) Appl. No.: 14/789,108

(22) Filed: Jul. 1, 2015

(65) Prior Publication Data
US 2017/0001128 A1 Jan. 5, 2017

(51) Int. Cl.
| | |
|---|---|
| *B03C 1/033* | (2006.01) |
| *B01D 17/04* | (2006.01) |
| *B03C 1/28* | (2006.01) |
| *B01D 46/00* | (2006.01) |
| *B01D 11/02* | (2006.01) |

(Continued)

(52) U.S. Cl.
CPC ........ *B03C 1/0332* (2013.01); *B01D 11/0211* (2013.01); *B01D 17/04* (2013.01); *B01D 17/06* (2013.01); *B01D 46/0034* (2013.01); *B03C 1/288* (2013.01); *B01D 11/0419* (2013.01); *B01D 2259/814* (2013.01); (Continued)

(58) Field of Classification Search
CPC ....... B03C 1/0332; B03C 1/033; B03C 1/288; B03C 2201/18; B01D 11/0211; B01D 17/06; B01D 21/0009; B01D 11/0419; B01D 46/0034; B01D 2259/814; G01N 33/54326; G01N 35/0098; B01L 2400/043; C22B 3/22
See application file for complete search history.

(56) References Cited

U.S. PATENT DOCUMENTS

| | | |
|---|---|---|
| 4,019,995 A | 4/1977 | Briggs et al. |
| 4,579,173 A | 4/1986 | Rosensweig et al. |

(Continued)

OTHER PUBLICATIONS

Fitzpatrick, R. (Feb. 2, 2006). Magnetic susceptibility and permeability. Retrieved from http://farside.ph.utexas.edu/teaching/em/lectures/node74.html.*

(Continued)

*Primary Examiner* — David C Mellon
*Assistant Examiner* — Liam Royce
(74) *Attorney, Agent, or Firm* — Cherskov Flaynik & Gurda, LLC

(57) ABSTRACT

Briefly, the invention provides a method for magnetically assisting demulsification of extraction phases, the method having the steps of contacting a first solution of a first solvent and a solvated paramagnetic metal ion with a second solvent, where the second solvent is immiscible with the first solvent; mixing the first and second solutions to create an emulsion having a first phase of the first solvent and second phase comprising the second solvent where the phases of the emulsion contain different concentrations of the paramagnetic metal ion; and applying a magnetic field gradient to the first and second phases of the emulsion to accelerate separation of the first phase from the second phase. Also provided is a system for demulsifying phases used in the extraction of paramagnetic moieties from solution having a lumen with an interior region, an interior surface, and exterior surface; and a magnetic field gradient present within the interior region.

17 Claims, 14 Drawing Sheets

(51) Int. Cl.
  *B01D 17/06* (2006.01)
  *C10G 33/02* (2006.01)
  *C22B 3/22* (2006.01)
  *B01D 11/04* (2006.01)

(52) U.S. Cl.
  CPC .......... *B03C 2201/18* (2013.01); *C10G 33/02* (2013.01); *C22B 3/22* (2013.01)

(56) References Cited

U.S. PATENT DOCUMENTS

| | | | |
|---|---|---|---|
| 4,675,486 A | 6/1987 | Niinuma | |
| 4,834,898 A | 5/1989 | Hwang | |
| 5,043,070 A | 8/1991 | Hwang | |
| 5,733,458 A * | 3/1998 | Kitazawa | B01D 11/0419 210/222 |
| 5,808,637 A | 9/1998 | Wenzel et al. | |
| 5,868,939 A * | 2/1999 | Oder | B01D 17/0214 210/695 |
| 6,767,745 B2 | 7/2004 | Chamberlain et al. | |
| 2003/0029795 A1* | 2/2003 | Galik | B01D 11/0457 210/634 |
| 2005/0266394 A1* | 12/2005 | Hatton | B03C 1/015 435/4 |
| 2011/0020509 A1* | 1/2011 | Kalb | B03C 1/015 426/237 |
| 2013/0015106 A1* | 1/2013 | Lins | B03C 1/0332 209/214 |

OTHER PUBLICATIONS

Suspensions and Colloids. (1999). Retrieved from http://www.edinformatics.com/math_science/suspensions_colloids.htm.*

W. Palyska & A. G. Chmielewski (1993) Solvent Extraction and Emulsion Separation in Magnetic Fields, Separation Science and Technology, 28:1-3, 127-138, DOI: 10.1080/01496399308019482 (Year: 1993).*

W. Palyska et al., Solvent Extraction and Emulsion Separation in Magnetic Fields, Separation Science and Technology, 1993, 28, 1-3, pp. 127-138, Taylor and Francis, United Kingdom.

Otsuji et al., "Monoclonal antibody A7 coupled to magnetic particles as a contrast enhancing agent for magnetic resonance imaging of human colorectal carcinoma", Cancer Immunol. Ummonother., No. 55, 728-733.

Goswami "Magnetic Stabilization of LMMHD Two-Phase Flow", International Journal of Multiphase Flow. Volu. 11, No. 3, pp. 347-359, 1985, p. 349.

Celotta et al., "Techniques to Measure Magnetic Domains", National Institute of Standards and Technology, Gaithersburg, Maryland 20899. Jun. 16, 1999, p. 4.

Suwa et al., "Magnetic Resonance Imaging of Esophageal Squamous Cell Carcinoma Using Magnetite Particles Coated with Anti-Epidermal Growth Factor Receptor Antibody", International Journal of Cancer. 75, 626-634 (1999), p. 627.

Ramchand et al., "Application of Magnetic Fluids in Medicine and Biotechnology", Indian Journal of Pure and Applied Physics. vol. 39, Oct. 2001, pp. 683,686, p. 684.

Kurlyandskaya et al., "Giant-Magnetoimpedance-Based Sensitive Element as a Model for Biosensors", App. Phys. Lett. 82, 3053 (2003); doi 10.1063/1.1571957, p. 3054.

Cai et al., "Multimodality Imaging of the HER-kinase Axis in Cancer", Eur. J. Nucl. Med. Mol. Imaging (2008) 35:186-208, DOI 10.1007/s00258-007-0560-9. p. 194.

Silveyra et al., "Domain Imaging in FINEMET Ribbons", Journal of Magnetism and Magnetic Materials. Apr. 7, 2010. p. 2797.

Giurgiutiu et al., "Passive and Active Tagging of Glass-Fiber Polymeric Composites for In-Process and In-Field Non-Destructive Evaluation", Center of Intelligent Material Systems and Structures, Virginia Polytechnic Instituted and State University, Blacksburg, VA 24061-0261. p. 624.

Morneau et al., "Analysis of Ferrofluids by Capillary Electrophoresis", Colloids and Surfaces, A: Physiochemical and Engineering Aspects 154 (1999) 295-301, p. 297.

Andren-Sandberg, "Conference Report: International Hepato-Pancreato-Biliary Association, IHPBA: Tokyo, Apr. 25-29, 2002", J. Hepatobiliary Pancreat. Surg. (2002) 9: 281-303, p. 286.

Lohden et al., "Magnetic Separation of Pinocytic Vesicles of Defined Age from Entamoeba Histolytica", Analytical Biochemistry 182, 77-83 (1989), p. 78.

Zimmels et al., "Effect of Electromagnetic Fields on the Wetting of Solids by Magnetizable Fluids", Journal of Colloid and Interface Science, vol. 99, No. 1 May 1984. p. 62.

* cited by examiner

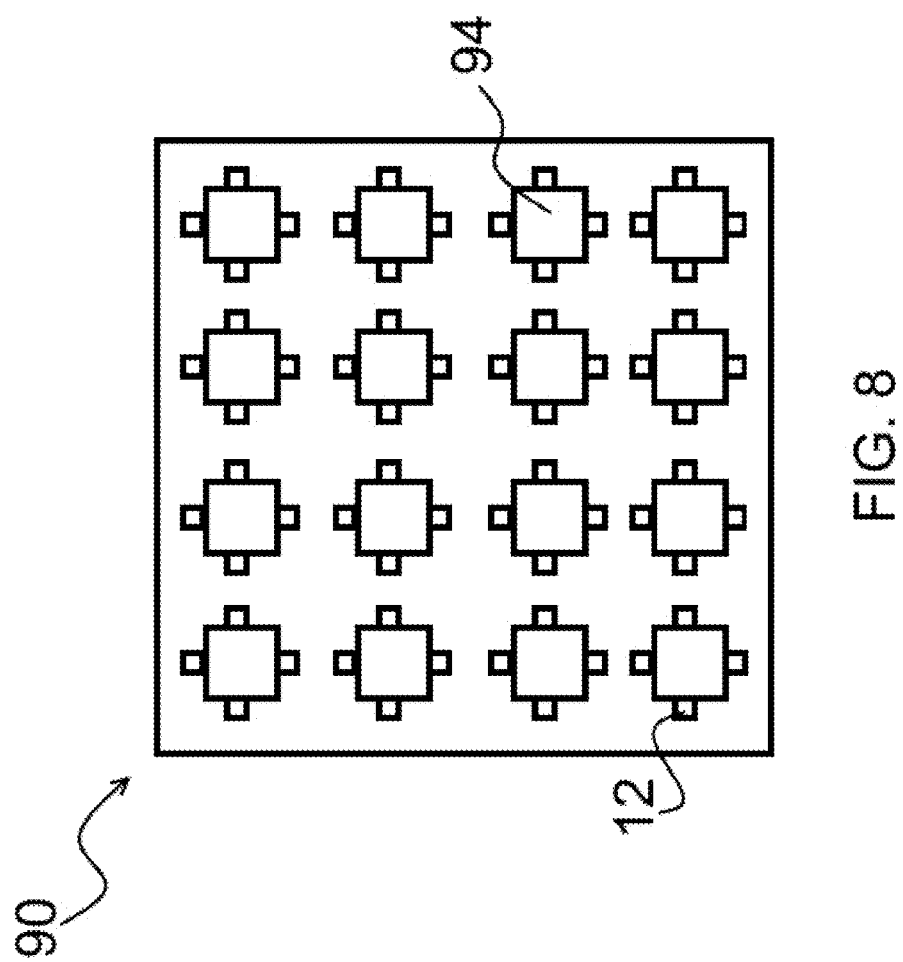

MAGNETICALLY ENHANCED PHASE SEPARATION FOR SOLVENT EXTRACTION

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to a method for isolating and purifying metal-containing solutions, and more specifically the invention relates to a method for enhancing demulsification and phase disengagement in metal extraction systems using magnets.

2. Background of the Invention

Selectively obtaining a compound or element from a mixture, liquid, solid, or gas, can be done in innumerable ways. One way is through solvent extraction. In solvent extraction, the chemical mixture containing a desired moiety is dissolved in a first solvent. The solution containing the moiety is then mixed with an immiscible second solvent that has a higher affinity for the desired moiety than the first solvent. After a thorough mixing of the immiscible solvents, the mixture settles, and the solvents separate over time. During the mixing and settling phases of a solvent extraction, the desired moiety will migrate between solvents because of the moiety's greater affinity for one of the solvents. Typically, the desired moiety should reside mostly or entirely in the second solvent after separation.

Frequently, a mixture containing a desired moiety is dissolved into an aqueous solution. The aqueous solution is then mixed with an organic solvent that is immiscible with water. Typically, the organic solvent will have a higher affinity for the desired moiety than the original aqueous solution. After the original aqueous solution and immiscible organic solvent are thoroughly mixed and then allowed to settle, the two solvents return to separate aqueous and organic phases based on differences in density of the aqueous and organic phases. After the desired moiety transfers to the organic phase, the organic phase is then called the "loaded organic phase."

Many commercial applications of solvent extraction reuse the organic solvent. These commercial applications strip the loaded organic phase of the desired moiety, using a clean aqueous phase devoid of undesired impurities. The stripped organic phase is then recycled for use in later extractions.

Solvent extraction, sometimes called liquid-liquid extraction, is commonly used in a wide array of applications, from the small scale (e.g., use of a single separatory funnel in a laboratory) to the large scale (e.g., separation of crude oil). In industry, solvent extraction is commonly used to separate desired metal ions after dissolving ore in mining operations. For example, solvent extraction is commonly used to obtain rare earth metals, platinum group metals, base metals, and nuclear materials. As the world's supply of high grade ores containing these materials decreases, solvent extraction becomes more important because solvent extraction is more effective in retrieving desired materials from low grade ores than other techniques.

In industrial applications of solvent extraction, the efficiency of the entire process is often hindered by demulsification issues, i.e., the slow or incomplete separation of the two immiscible solvents used in the solvent extraction process. In such circumstances, two conventional solutions are utilized: (1) spinning the mixture of emulsified immiscible solvents in a centrifugal contactor and (2) demulsification-aiding additives.

Solvent extractions hindered by slow demulsification often utilize centrifugal contactors to spin the mixture of immiscible solvents in order to separate the solvents based on the difference in the two solvents' densities. These centrifugal contactors are effective in demulsifying extraction mixtures that would otherwise very slowly or never completely demulsify without intervention.

Centrifugal contactors are expensive to incorporate into existing processing schemes and refineries, mechanically complex, and difficult to maintain. Large scale solvent extractions hindered by demulsification inefficiencies require many centrifugal contactors, causing large initial and ongoing costs. Also, centrifugal contactors are less effective when separating phases with similar densities; a common occurrence in solvent extraction systems where the organic phase becomes heavy as it is loaded with metal ions.

Other methods for increasing the efficiency of solvent demulsification include the use of chemical additives. However, chemical additives also have drawbacks. First, purchasing chemical additives on a large scale and on an ongoing basis is expensive. Also, to ultimately obtain a purified desired moiety, any demulsification aids must be removed to obtain that purified final product. Further, chemical additives must be removed downstream from extraction processes in order to recycle solvents and to prevent runoff into the environment. Removing additives downstream from an extraction process therefore requires extra steps and additional costs.

Aside from using chemical additives, physically inert solid phase additives have been employed. Specifically, researchers have added magnetic nanoparticles to emulsifications and then subjected that mixture to magnetic fields in attempts to change the magnetic susceptibility of one component of the emulsion, thereby enhancing its separation tendencies. However, as with the use of chemical additives, these additions recreate secondary waste streams which must be addressed. For example, the magnetic particles need to be removed downstream during final polishing of the target moiety.

Furthermore, the addition of relatively inert aggregate material stymies the fluidity of the mixture, particularly in pumping protocols. Therefore, such magnetic particles, fluidized beds, etc., are contraindicated when continuous, pumpable, all liquid processes are sought.

Thus, a need exists in the art for a method and system of accelerating the demulsification of solvents in solvent extractions that are hindered by slow or indefinite demulsification. Ideally, the method and system would not require modification of the extraction infrastructure or the removal of unwanted impurities downstream (i.e., a secondary waste stream).

SUMMARY OF INVENTION

An object of the invention is to provide a method for accelerating demulsification and phase disengagement in extractions of paramagnetic metal ions that overcomes many of the disadvantages of the prior art.

Another object of the present invention is to provide a method and system for demulsifying solutions having different magnetic susceptibilities. A feature of the method is simultaneously subjecting different fluids with different concentrations of partitioned metal to magnetic fields. An advantage of the method is that pumping of the fluid throughout the various extracting phases is enabled so as to remove target metal ions, chelated metal moieties, biological compounds comprising coordinated metals and other targeted moieties in an uninterrupted protocol.

Yet another object of the invention is to accelerate demulsification and phase disengagement within emulsions containing paramagnetic metal ions. A feature of the method is subjecting the fluids-only mixtures (e.g. mixtures containing no solids whatsoever) to magnetic fields to create magnetic field gradients within the mixtures. This accelerates the coalescence of liquid emulsion droplets into larger droplets that separate from the continuous solvent. An advantage of the invention is that separation is facilitated by both magnetic and gravitational forces, resulting in expedited separations. No additions to the fluid, such as solid substrates (e.g., magnetic- or metallic- or nonmetallic-particles), demulsifiers, or other chemicals, are necessary to facilitate the phase separation.

Still another object of the invention is to provide a method for enhancing phase separation within emulsions. A feature of the invention is using magnetic fields to accelerate coalescence of emulsion droplets into larger droplets that phase separate through gravity. An advantage of the invention is that empirically determined magnetic field positioning projects a high magnetic field gradient across a three-dimensional space containing a volume of emulsion, thereby inducing accelerated phase disengagement within the sample volume and improved phase clarity compared to situations where only gravity is relied upon to effect separations. Another advantage of the method is that its magnetically induced effects of creating larger emulsion droplets remains after the magnetic field is removed, thereby accelerating gravitational phase separation.

Yet another object of the invention is to provide a process aid in large scale solvent extractions involving paramagnetic metal ions. A feature of the invention is that it aids in the separation of phases of emulsions after an extraction process has transferred the paramagnetic metal ions from a first native phase to a second phase. An advantage of the invention is that it can use inexpensive magnets (e.g. permanent magnets) to aid in the demulsification and phase disengagement of existing extractions without expensive modifications to the existing extraction infrastructures.

Briefly, the invention provides a method for magnetically assisting demulsification of extraction phases, the method comprising the steps of contacting a first solution comprising a first solvent and a solvated paramagnetic metal ion with a second solvent, wherein the second solvent is immiscible with the first solvent; mixing the first and second solutions to create an emulsion having a first phase comprising the first solvent and second phase comprising the second solvent wherein the phases of the emulsion contain different concentrations of said paramagnetic metal ion; and applying a magnetic field gradient to the first and second phases of the emulsion for a time and at a magnetic gradient strength sufficient to accelerate separation of the first phase from the second phase.

Also provided is a system for extracting paramagnetic moieties from solution comprising an elongated reaction chamber defining a lumen (such as conduit, a fluid passage way, a channel, etc) having an interior region, an interior surface, and exterior surface; and a magnetic field gradient present within the interior region. Preferably, the elongated reaction chamber has an ingress port and an egress port so that the system and method can accommodate a continual stream of feedstock, and therefore be run continuously. Said system further comprises at least one pair of magnets fixed to opposing sides of the exterior surface of the lumen at substantially the same point along the lumen's longitudinal axis wherein the magnets are substantially parallel and wherein the magnets face the interior of the lumen with the same magnetic pole.

BRIEF DESCRIPTION OF DRAWING

The invention together with the above and other objects and advantages will be best understood from the following detailed description of the preferred embodiment of the invention shown in the accompanying drawings, wherein:

FIG. 8 depicts an alternate embodiment of the magnetic phase separation block utilizing mesh, in accordance with the features of the invention.

DETAILED DESCRIPTION OF THE INVENTION

Figure 1:
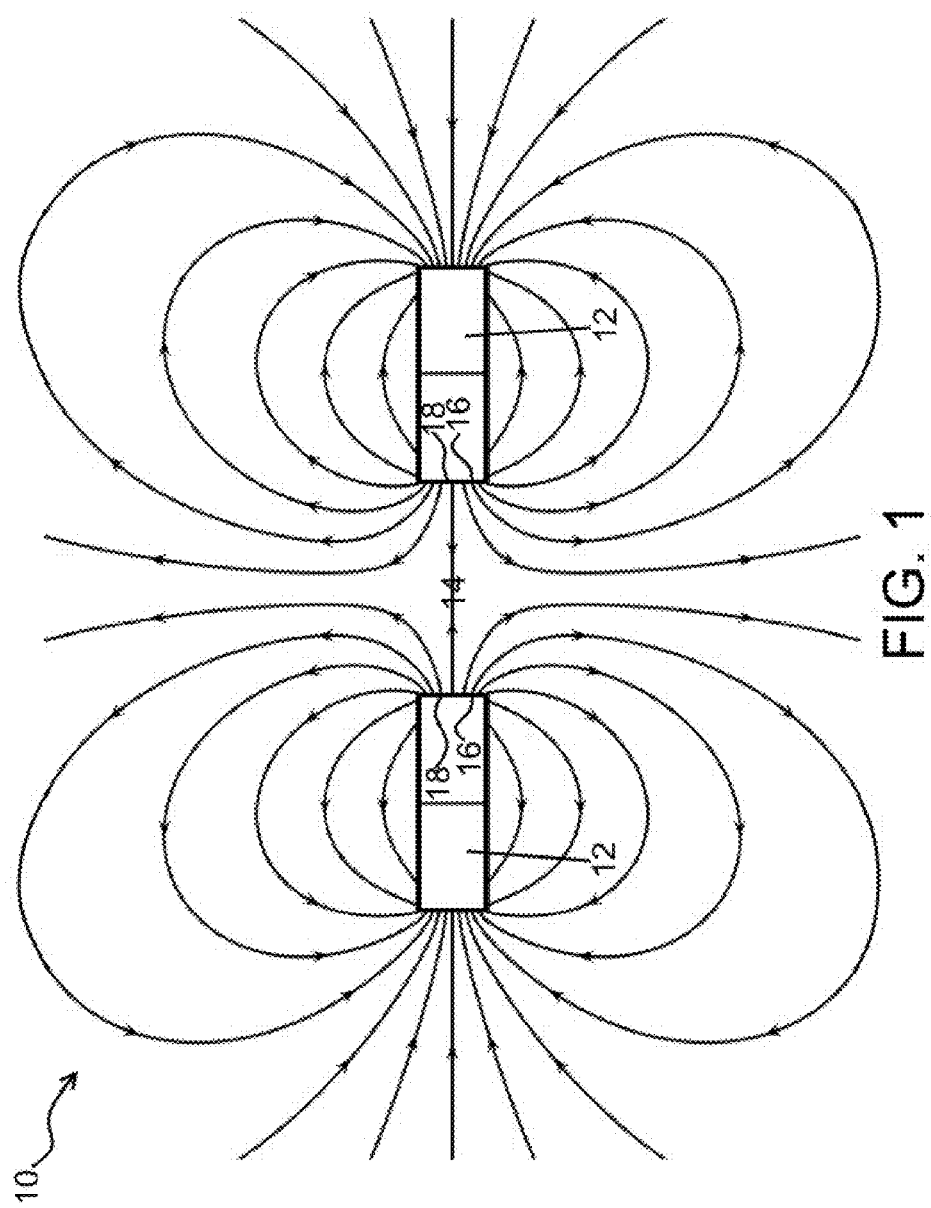
FIG. 1 depicts a schematic of a solvent extraction configuration using two magnets, in accordance with the features of the invention.

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

An embodiment of the invention leverages the paramagnetic nature of metal ions residing in one constituent of a multi-phase mixture over another constituent. Magnetic field gradients applied to all constituents of the mixture accelerate phase disengagement (a.k.a. demulsification) compared to allowing the phases to settle through gravity alone by accelerating droplet coalescence within the constituent within which the metal ion is most solvated. "Accelerated phase disengagement and demulsification" means that phase demulsification and phase disengagement occur faster than if gravity alone were acting on a mixture of phases. "Paramagnetic" means that the material has a relative magnetic permeability greater than or equal to 1. Phases of paramagnetic fluids vary in their paramagnetic character, with some phases being more paramagnetic than other phases. The relatively more paramagnetic phases are attracted more strongly by magnetic field gradients than less paramagnetic phases.

Specifically, the inventor has discovered that the application of magnetic field gradients to emulsions created in solvent extractions of paramagnetic metal ions (whereby the ions are solvated by the solvents) accelerates demulsification and phase disengagement. Acceleration of demulsification and phase disengagement occurs when the imposed magnetic field gradient transforms substantially the entire bulk of the emulsified solvent extraction system (e.g., an entire emulsified mixture) into a paramagnetic fluid having varying degrees of magnetism. The effects of the applied magnetic field gradient are permanent such that separation of targeted phases remains after the magnetic field is removed.

Therefore, the magnetic field aids in gravity induced separation of constituent phases. Both the magnetic and gravitational forces can be imposed simultaneously, even though, and as stated supra, the magnetic field can be applied, then removed without losing the effect of its action on the emulsion.

The invention provides accelerated demulsification and phase disengagement in solvent extractions involving solvated paramagnetic metal non-solid moieties, examples of such moieties including metal ions, coordination compounds, metal containing or magnetizable biological molecules, metal ions in various solutions (water, polar organic solvents e.g., alcohols, aldehydes, ketones, glycols, acetates, carboxylic acids, peroxides, ethers, etc.), metal ions coordinated to macromolecules such as polymers and other incarnations where metal ions are solvated within a fluid phase, and combinations thereof. The above-stated moiety types are not solid and not intended to be inasmuch as the non-solid moieties envisioned for isolation and extraction hereby enables the use of a continuous, pumpable protocol to streamline metal recovery.

The invented method and system is easily scalable. This means that it is applicable to a myriad of extraction process modalities, including, but not limited to separatory funnels, metal piping, polymer piping and inside industrial-scale mixer-settlers. Embodiments of the invention which use permanent magnets do not require a power source.

The instant invention generally provides a magnetic field gradient to a mixture of immiscible solvents, containing unequal concentrations of paramagnetic metal ions. Mixing two immiscible solvents creates an emulsion with droplets of one phase dispersed in the other. Application of the magnetic field gradient applies force to the droplets depending on the partitioning of paramagnetic metal ions between the dispersed phase and the dispersion medium. For example, in a solvent extraction system, an aqueous phase is usually mixed with a water-immiscible organic phase (such as an oil). If the volume of water is less than that of the oil, then the water becomes the dispersed phase and oil is the dispersion medium after the phases are mixed into an emulsion. In this case, if the paramagnetic ions reside mainly in the dispersed water droplets, then the droplets will be attracted by a magnet and forced together close to the magnet surface.

Conversely, if the paramagnetic metal ions reside mainly in the oil (i.e. the dispersion medium), then the water droplets will be forced away from the magnet's surface as the metal-laden oil phase is attracted by the magnets. As such, the magnetic fields act on the metal ions collectively within a phase and impose a force on the entire phase. Magnetic forces exerted on the emulsion will depend on the volume ratios of the phases and the chemical partitioning of the paramagnetic metal ions between the phases. In all scenarios, the force exerted by the magnetic field will accelerate demulsification of the emulsion, provided that the phases have different magnetic susceptibilities as imparted by the unequal partitioning of paramagnetic metal ions between phases.

In summary of this point, if a first metal moiety (such as metal ion) is more soluble in organic phase than a second metal moiety, then the first metal moiety will be extracted away from the second metal. The magnetic field acts on this entire metal-oil mixture, and not necessarily on the individual ions or charges that the moiety may carry. The extraction experienced by the metal moieties is the result of their unpaired electrons interacting with complementary electrons of molecules defining the extraction media. The effect of net charge is relatively minor. Indeed, the Brownian motion of any of the metal moieties facilitates their dispersion through the emulsion and more than overcomes any effect of a magnetic field on moiety charge.

In either example described above, the magnetic effect forces the droplets of the dispersed phase together. When droplets of the same phase are forced together, they conglomerate and become a larger drop. As the dispersed droplets get larger and larger, large drops of the dispersed phase then separate from the dispersion medium due to gravity.

The force applied by the magnetic field gradient simultaneous with the ubiquitous force of gravity accelerates droplet coalescence which therefore accelerates the phase disengagement. Acceleration of the coalescence due to the magnetic forces density gradient between the two phases therefore accelerates phase disengagement and demulsification.

FIG. 1 is a schematic diagram of a dipolar configuration 10 of the instant invention. This dipolar configuration 10 generally comprises a pair of magnets 12 wherein each magnet 12 is positioned an equal distance from a center point 14. Both magnets 12 are removably fixed in position so that the like poles 16 face each other and the faces 18 of the magnets 12 are substantially parallel. In an embodiment, the like poles 16 are both north. In another embodiment, the like poles 16 are both south. In the dipolar configuration 10, the coupling of the magnets 12 causes a net magnetic field strength of about 0 T at the center point 14. In the dipolar configuration, an empirically measured magnetic field strength of 0 T at the center point 14 indicates that the magnets 12 are coupled for providing the maximum magnetic field gradient.

Curved arrows in FIG. 1 show the direction of the applied magnetic field. FIG. 1 shows the magnetic field gradient through spacing between the magnetic field lines. Wider spacing between magnetic field lines represents higher magnetic field gradients. In the dipolar configuration 10, the magnets 12 create a strong magnetic field gradient with the like poles repelling each other. Field strengths can be determined empirically, or via computer simulation. For example, when using 0.5 T magnets (e.g., FeNdB magnets) the field strength on the surface of the magnets is 0.5 T. In the coupled arrangement with opposite poles facing, the field strength in the middle is 0 T. If the magnets are about 1.5 cm apart, then from the central point to the magnetic surface there is a magnetic field change (gradient) from 0 T to 0.5 T.

The instant invention can utilize magnets of any kind, shape, and material. Exemplary kinds of magnets include temporary, electro, and permanent. Exemplary magnet shapes include bars, blocks, horseshoes, rods, and rings. Exemplary materials include Alnico (alloy of aluminum, nickel, and cobalt), Neodymium, Ferrite, and combinations thereof. The instant invention can utilize magnets of any strength. Preferably magnets used in the instant invention have strengths from about 0.1 T to about 1 T, more preferably from about 0.3 T to about 1 T and most preferably from about ½ T to about 1 T.

In the dipolar configuration 10, the magnetic field gradient created by the magnets 12 is applied to a feedstock comprising a mixture of immiscible solvents, with paramagnetic metal ions partitioned between the emulsified phases. Immiscibility of the solvents in the feedstock creates an emulsion in which droplets of one immiscible solvent (the dispersed phase) form in a matrix of the other immiscible solvent (dispersion medium). The solvent creating a matrix (dispersion medium) is a first phase (the second phase 34 of FIG. 3B), where the other solvent (the dispersed phase) is a second phase (the first phase 31 of FIG. 3B). The magnetic field gradient created by the magnets 12 applies force on the dispersed droplets and the dispersion medium the following equation, which is the general equation describing a magnetic force acting on a particle:

$$F = \frac{(\chi_2 - \chi_1)VB(\nabla B)}{\mu_0}$$

where $\chi_2$ is the magnetic susceptibility of the dispersed droplets (the first phase 31 shown in FIG. 3B, $\chi_1$, is the magnetic susceptibility of the dispersion medium (the second phase 34 shown in FIG. 3B), V is the volume of the dispersed droplets that is experiencing force from the magnetic field gradient, B is the strength of the magnetic field and $\nabla B$ is the magnetic field gradient, and $\mu_0$ is the permeability of the vacuum.

Returning to FIG. 1, the magnetic field gradient generated by the magnets 12 is applied to an emulsion of immiscible solvents with paramagnetic metal ions partitioned unevenly between the phases of the emulsion. This mixture defines an emulsion of droplets of the solvents instead of a homogenous solution. In the instant invention, the dispersed phase droplets (e.g., comprising an aqueous substance) and the dispersion medium (e.g., comprising an organic substance) will contain unequal concentrations of paramagnetic metal ions (a situation frequently encountered in solvent extraction processes for metal refining).

Paramagnetic ions having any charge are suitable for use with the instant invention. Further, the instant invention is suitable for use to accelerate the demulsification of an extraction emulsion containing more than one paramagnetic ion.

If the concentration of paramagnetic metal ion in the dispersed droplets is greater than the concentration in the dispersion medium, the magnetic field gradient generated by the magnets 12 will apply a force to the dispersed phase droplets in the direction toward the nearest magnet as the magnetic susceptibility, $\chi_2$, of the dispersed droplets will be greater than the magnetic susceptibility of the dispersion medium, $\chi_1$. Under the influence of the magnetic force, the droplets of the phase containing more paramagnetic metal material accelerate and move toward the nearest magnet and are compressed together near the magnet surface, causing the droplets to coalesce into larger droplets.

If the dispersed droplets do not contain or contain less of the paramagnetic metal ion than the dispersion medium then the droplets will experience force in a direction away from the magnets, as the magnetic susceptibility, $\chi_2$, of the dispersed droplets will be less than the magnetic susceptibility of the dispersion medium, $\chi_1$. The force on the dispersed droplets in this scenario compresses the droplets into the phase volume between the magnets and causing the droplets to coalesce into larger droplets. Therefore, if the droplets contain a higher concentration of paramagnetic metal ion than the dispersion medium, they will coalesce into large drops near the magnets 12. If the droplets contain a lower concentration of paramagnetic metal ion than the dispersion medium then they will coalesce in between the magnets 12.

Solvent extraction relies on differences in density of the phases to separate the phases as they settle through gravitational forces. The magnetic force applied using the instant invention causes droplets of one phase to coalesce in one position while droplets of the other phase conglomerate in another position. As a result of the conglomeration of drops, droplets of higher volume and mass are formed, causing them to settle due to gravity. The magnetic force of the instant invention accelerates drop coalescence which accelerates the formation of larger droplets of greater mass and volume, which results in accelerated demulsification and phase separation of the solvent mixture feedstock.

Figure 2:
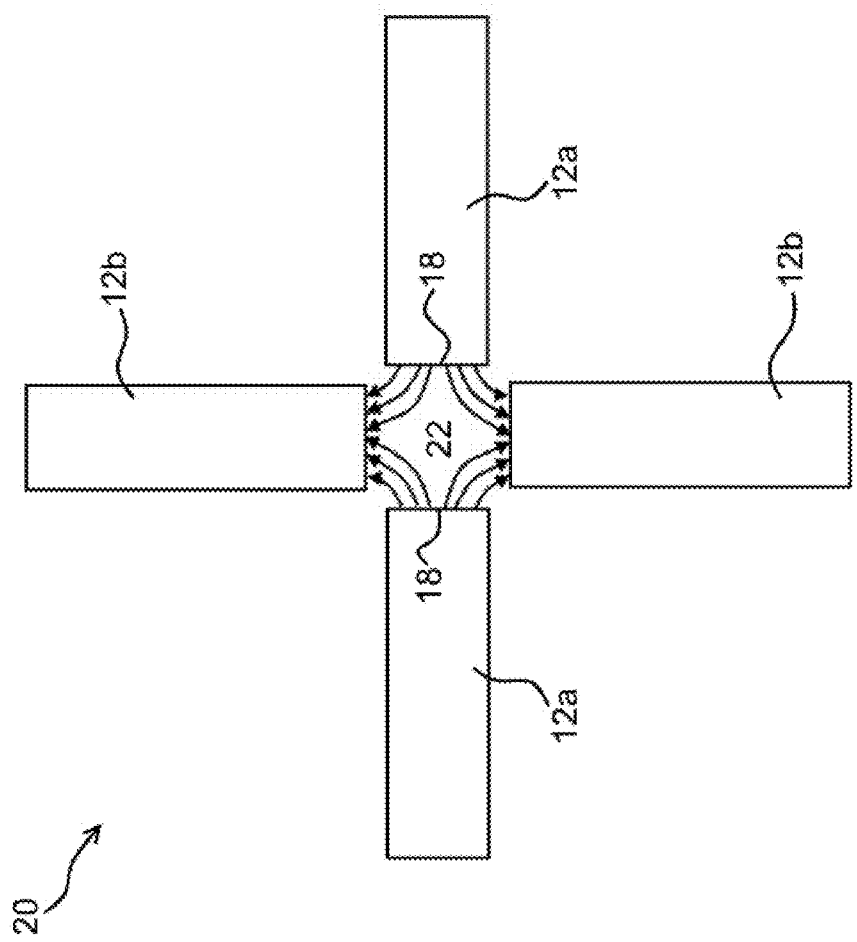
FIG. 2 depicts a schematic of a solvent extraction configuration using four magnets, in accordance with the features of the invention.

FIG. 2 is a schematic diagram of a quadrupolar configuration 20 of the instant invention. This quadrupolar configuration 20 comprises a first pair of magnets 12a wherein each of the first pair of magnets 12a is positioned an equal distance from a center point 22. Both of the first magnets 12a are fixed in position so that like poles face each other and the faces 18 of the magnets 12a are substantially parallel. The quadrupolar configuration 20 further comprises a second pair of magnets 12b wherein the second pair of magnets 12b are in the same plane as and substantially perpendicular to the first pair of magnets 12a. Each of the second pair of magnets 12b are equidistant from the center point 22, have like poles facing, and are substantially parallel to each other. The poles of the second magnets 12b that face the center point 22 are the opposite poles than the poles of the first pair of magnets 12a facing the center point 22.

In this quadrupolar configuration 20, the first pair of magnets 12a repel each other at the center point 22. The second pair of magnets 12b also repel each other at the center point 22. With two pairs of magnets repelling each other at the center point 22, a stronger magnetic field gradient is generated in the quadrupolar configuration 20 than the dipolar embodiment 10. The direction of the magnetic field in the quadrupolar embodiment is shown using the curved arrows in FIG. 2. In the quadrupolar configuration 20, the coupling of the magnets 12 causes a net magnetic field strength of about 0 T at the center point 22. In the quadrupolar configuration 20, an empirically measured magnetic field strength of 0 T at the center point 22 indicates that the magnets 12 are coupled for providing the maximum magnetic field gradient.

Dipolar configurations 10 and quadrupolar configurations 20 are suitable configurations of magnets that can be used with the instant invention. Typically, magnets are provided in pairs to assure symmetry, but odd numbered magnets positioned such that the magnetic gradient is focused on a predetermined region in the mixing chamber are also suitable. As such, the illustrated configurations are provided not to be limiting but to give examples of magnet configurations capable of creating a magnetic field gradient across a sample volume.

Any configuration of magnets capable of generating a magnetic field gradient is suitable for use with the instant invention. Preferably, magnets are spaced from each other wide enough to avoid fluid clogging within the lumen as larger droplets form from the coalescence of originally-present smaller droplets in the emulsion. This will facilitate the "continuous" de-emulsification feature of the invention.

Conversely, the magnets are spaced close enough to each other so that their magnetic fields enhance each other to generate field gradients greater than if only a single magnet were present. Generally, configurations wherein all of the positive poles (or negative poles) are opposed to each other will provide adequate strength field gradients. However, configurations of magnets wherein negative poles oppose positive poles are suitable for use where sufficient magnetic field gradient is generated to project across an entire sample volume.

Also, using a pair or plurality of pairs of magnets, or odd numbered magnets at strategic locations along a mixing chamber produce good results. For example, a plurality of dipolar and quadrupolar configurations can be arranged downstream of a first configuration along a conduit, to assure complete separation. Also, odd numbers of magnets, if symmetrically placed about a conduit, can also be utilized, for example, three magnets triangularly positioned.

In summary of this point, phase disengagement is accelerated by increasing magnetic field gradient (symbolized by $\nabla B$ in Equation 1, supra). Different configurations and magnet strengths are applied to empirically determine the adequate separation characteristics desired for particular applications of the invention. A plurality of gradients, serially arranged relative to each other along the longitudinal axis of a mixing chamber, also is suitable.

Figure 3:
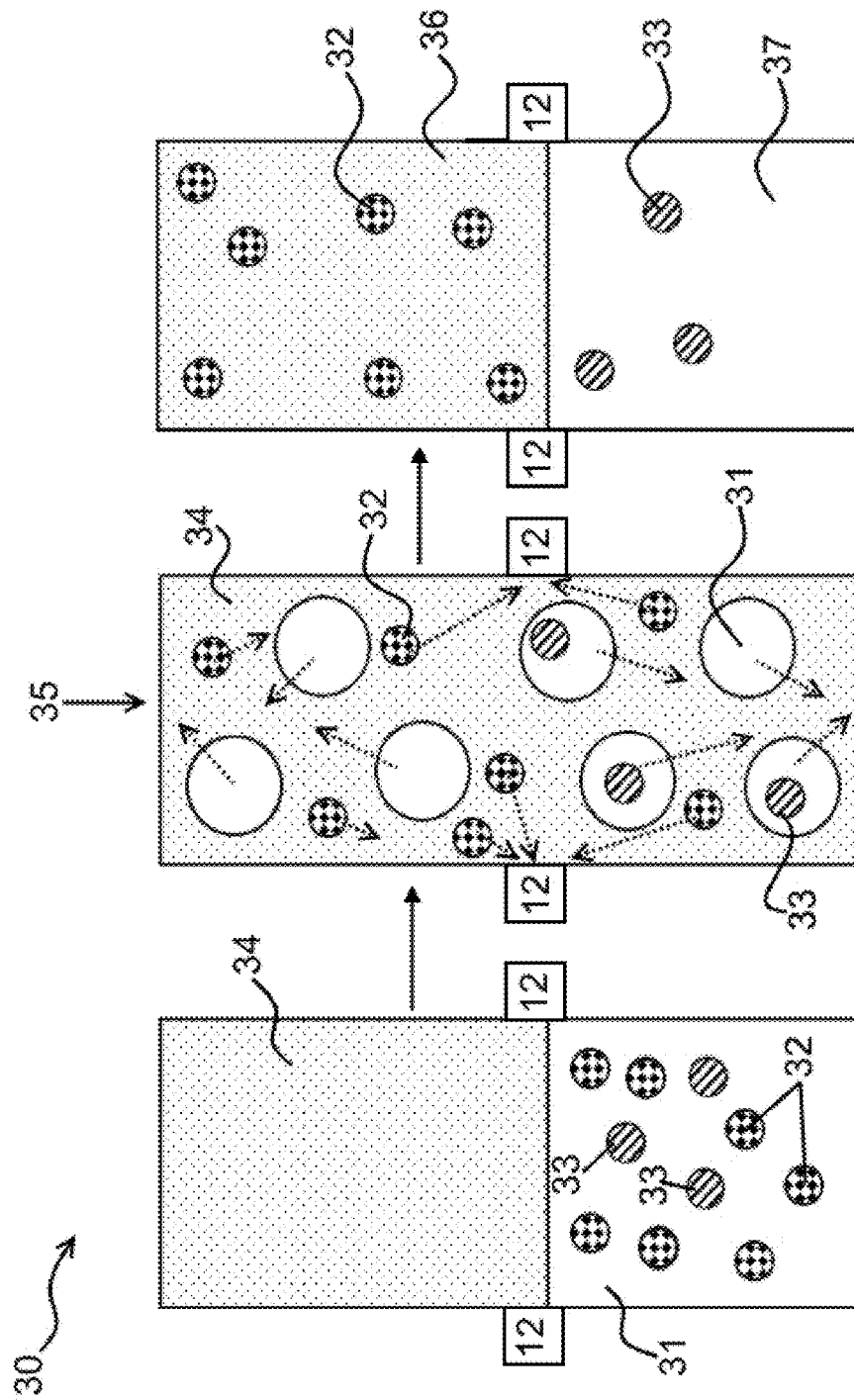
FIGS. 3A-C depict process schematics of extracting metal ions and isolating the phases containing those ions with FIG. 3A showing the initial step of contacting two immiscible phases, FIG. 3B showing the phases after agitation, and FIG. 3C showing the phases after the extraction is completed, in accordance with features of the invention.

FIG. 3 is a process flow chart depicting an exemplary extraction of paramagnetic ions carried out using the instant invention. A salient feature of the invention is establishing a difference in magnetic susceptibility between the two phases in the emulsion (.e.g., unequal concentrations of paramagnetic ions between the two phases). As such, FIG. 3, depicting just one paramagnetic metal ion transferring from one phase to another is just one example of a solvent extraction system. Rather, there could be a plurality of metal ions partitioning between phases defining the system. This means that it does not matter whether the target ions or non-extracted ions are paramagnetic. Also, separation can be achieved if undesired metal ions stay in the aqueous phase.

The process 30 depicted in FIG. 3A begins, by contacting a first phase 31 with a second phase 34. The first phase comprises a first solvent containing desired paramagnetic metal ions 32 and undesired metal ions 33. The second phase comprises a second solvent that is immiscible with the first solvent and has a higher affinity for the paramagnetic metal ion 32 than the first solvent.

In an embodiment, the instant invention can be used to accelerate the demulsification and phase disengagement of extractions targeting metal ions that are not paramagnetic. Where a target metal ion is not paramagnetic, the instant invention accelerates demulsification and phase disengagement of an extraction targeting said metal as long as there are unequal concentrations of paramagnetic metal ions between the two phases. This can be achieved where the targeted metal ion is not paramagnetic, for example, if the undesired metal ions 33 that stay in the first phase 31 are paramagnetic.

Solvents and solvent ratios for use with the instant invention can be selected according to conventional extractions of the target ions. Examples of suitable solvent systems can be found in *Metal complexes for hydrometallurgy and extraction,* Tasker, P. A.; Plieger, P. G.; West, L. C. Edited by McCleverty, Jon A.; Meyer, Thomas J, Comprehensive Coordination Chemistry II (2004), 9, 759-808, the entirety of which is hereby incorporated by reference.

The two phases are then agitated or mixed creating an emulsion 35, as depicted in FIG. 3B. After agitation, the target moiety 32 resides mostly or entirely in the second phase of FIG. 3A. If one or both of the metal ions 33 and 32 are paramagnetic, then the unequal partitioning of ions between the phases will result in the phases having a different magnetic susceptibility. Paramagnetic materials align their valence electrons to align their internal magnetic fields with external magnetic fields. Thus, the phase containing more of the paramagnetic metal ion will have a higher magnetic susceptibility, $\chi$, than the phase containing a lower concentration of paramagnetic metal ion. A magnetic field gradient created by the two magnets 12 of the dipolar configuration 10 or by the four magnets of the quadrupolar configuration (not shown), or any other configuration of magnets that projects a magnetic field gradient across a sample volume is applied to the emulsion 35. The magnetic field gradient generated by the magnets applies a force to both phases of the emulsion 35.

In an embodiment, the second phase 34 of FIG. 3A is present in a larger volume than the first phase 31. Thus, $\chi_2$ is the magnetic susceptibility of the first phase 31 and $\chi_1$ the magnetic susceptibility of the second phase 34. $\chi_1$ will be greater than $\chi_2$ if the second phase 34 contains most or all of the paramagnetic metal ion 32 as the second phase 34 will then have a higher magnetic susceptibility than the first phase 31. In this embodiment, looking to the relationship-defining force above, the second phase 34 containing the paramagnetic metal ion 32 will experience force toward the nearest magnet 12 as the force will be positive. Conversely, the first phase 31, will experience force away from the magnets 12 as the force will be negative because it contains a lower concentration of the paramagnetic ion 32, and therefore has a lower magnetic susceptibility, than the second phase 34.

Force is designated by the dashed arrows of FIG. 3B. As noted above, the forces generated by the magnets 12, will cause conglomeration of large drops of each phase as they are compressed towards or away from the magnets. As the two phases have different densities, the coalescence of drops caused by the magnets 12 will accelerate the creation of droplets with greater volume upon which gravitational (or buoyancy) forces will also begin to act with greater magnitude, accelerating phase separation further.

After the magnetic field gradient created by the magnets 12 is applied to the emulsion, two augmented phases emerge, as depicted in FIG. 3C. These phases are a first hybrid phase 36 comprising the paramagnetic metal ion 32 dissolved in the second solvent and a second hybrid phase 37 comprising the first solvent and any undesired impurities 33.

Figure 4:
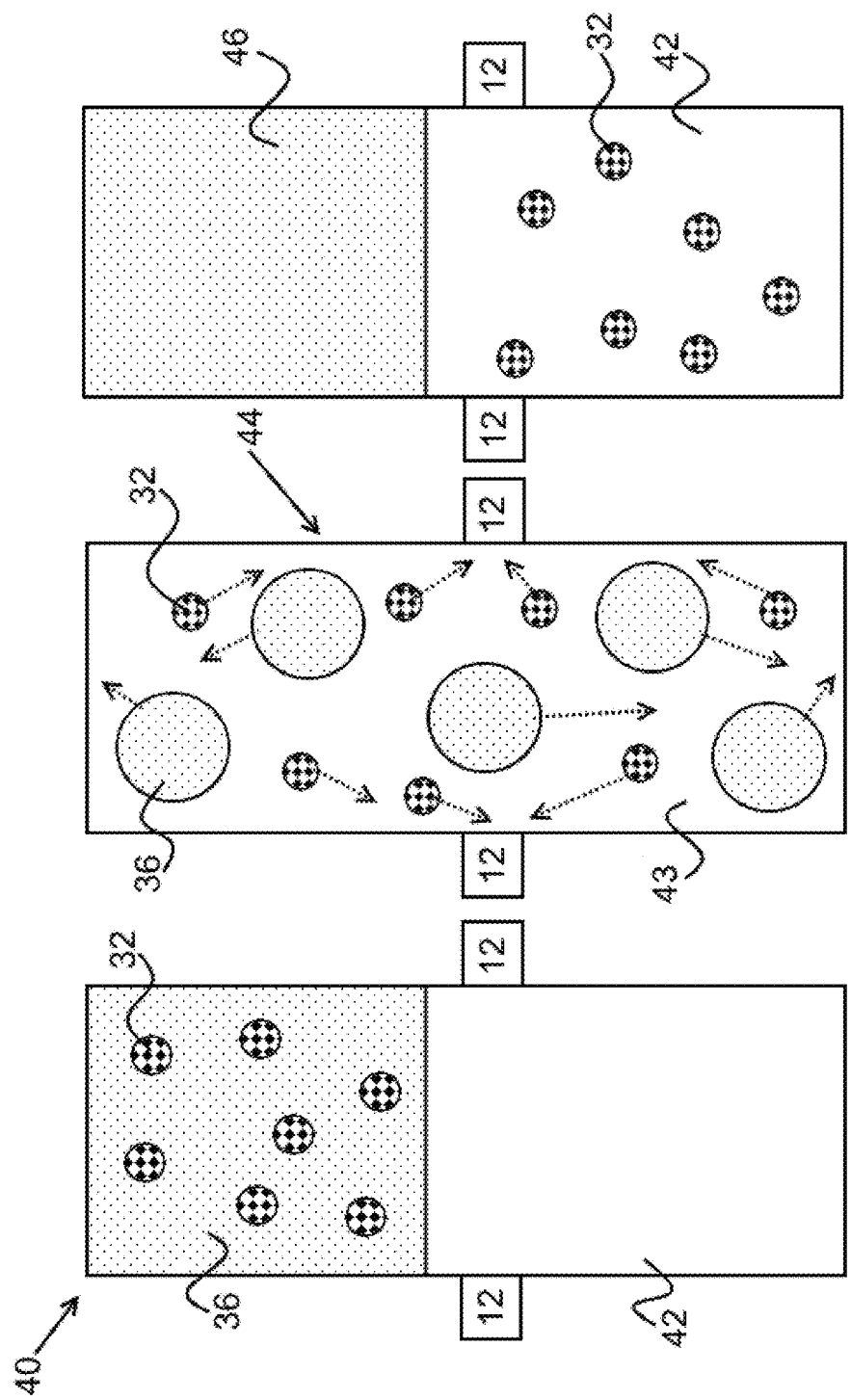
FIGS. 4A-C depict a process flowchart for stripping a loaded phase after extraction with FIG. 4A showing the initial step of contacting two immiscible phases, FIG. 4B showing the phases after agitation, and FIG. 4C showing the phases after the extraction is completed, in accordance with features of the invention; in accordance with features of the invention.

FIG. 4 is a process flow chart depicting a back-extraction or stripping whereby the second solvent is harvested for reuse. The process 40 begins as depicted in FIG. 4A by contacting the first hybrid phase 36 resulting from the extraction of FIG. 3 with a third phase 42. This third phase 42 has a higher affinity for the paramagnetic metal ion than the second solvent.

The solutions are then agitated or mixed creating an emulsion 44 of the two solutions, as depicted in FIG. 4B. After agitation, the paramagnetic metal ion 32 enters and resides mostly or entirely in the third phase 42 to form a third hybrid phase 43. Paramagnetic materials align their valence electrons to align their internal magnetic fields with external magnetic fields. Thus, the phase containing more of the paramagnetic metal ion will have a higher magnetic susceptibility, $\chi$, than the phase containing a lower concentration of paramagnetic metal ion. A magnetic field gradient created by the two magnets 12 of the dipolar configuration 10 or by the four magnets of the quadrupolar configuration (not shown) is applied to the emulsion 44.

In an embodiment, the third hybrid phase 43 is present in a larger volume than the first phase 36. Thus, $\chi_2$ is the magnetic susceptibility of the first phase 36 and $\chi_1$ the magnetic susceptibility of the third phase 42. $\chi_1$ will be greater than $\chi_2$ as the third hybrid phase 43 contains most or all of the paramagnetic metal ion 32. In this embodiment, looking to the relationship defining force above, the third hybrid phase 43 containing the paramagnetic metal ion 32 will experience force toward the nearest magnet 12 as the force will be positive. Conversely, the first phase 36, will experience force away from the magnets as the force will be negative. Force is designated by the dashed arrows of FIG. 4.

As noted above, the forces generated by the magnets 12, will cause conglomeration of large drops of each phase. As the two phases have different densities, the conglomeration of drops caused by the magnets 12 will accelerate the creation of a density gradient. The accelerated formation of a density gradient will accelerate separation of the two phases, thereby accelerating demulsification and phase disengagement based on gravity. of the emulsion 44.

After the magnetic field created by the magnets 12 is applied to the emulsion, two phases reestablish as depicted in FIG. 4C. These two phases include the third phase 42 comprising the paramagnetic metal ion 32 dissolved in the third solvent and a fourth phase 46 that is the same as the second solution of 34 of FIG. 3 comprising the second solvent. The second solvent can be reused to extract a desired paramagnetic metal ion after it has been stripped using the instant invention.

One embodiment applies a magnetic field gradient generated from either the dipolar configuration 10 or the quadrupolar configuration 20 to an extraction in a stationary vessel on a fixed volume of solutions. Other embodiments apply a magnetic field gradient generated from either the dipolar configuration 10 or the quadrupolar configuration 20 to modalities transporting extraction emulsification. In these embodiments, the instant invention applies a magnetic field gradient to a flowing mixture of immiscible solvents, one solvating a paramagnetic metal ion, and applies force to both phases of the mixture of immiscible solvents while they are flowing in a tube or other liquid-carrying modality.

Figure 5:
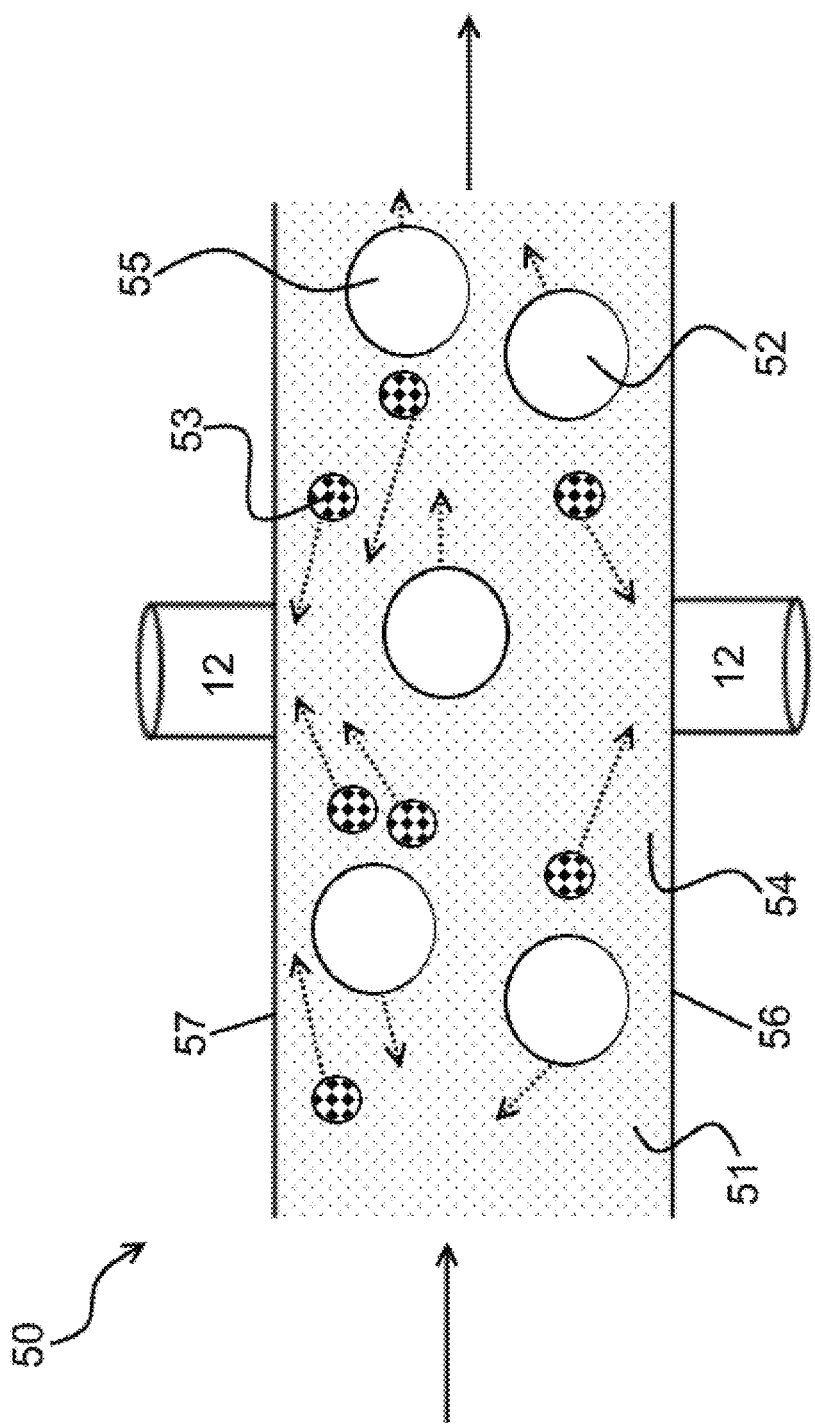
FIG. 5 depicts the application of a magnetic field to a flowing feedstock; in accordance with the features of the invention.

FIG. 5 depicts a system 50 applying the magnetic field gradient generated by the dipolar configuration 10 to a flowing feedstock comprising an immiscible mixture of a first solvent 51, second solvent 52 and a paramagnetic metal ion 53. The immiscible mixture results in two phases, a first phase 54 comprising the first solvent 51 solvating most or all of the paramagnetic metal ion 53, and a second phase 55 comprising the second solvent 52. The system 50 generally comprises a lumen 56 and the two magnets 12 of the dipolar configuration 10 fixed to the outer surface of the lumen 57.

The lumen can comprise any material capable of carrying flowing liquid. Exemplary materials include polymers and metals. Ferrous or magnetic tubing also can be utilized when magnets are placed within the mixing chamber. Additionally, the lumen can be of any shape and dimension depending on the scale of the application of the instant invention. In instances where magnets are positioned external of the mixing chamber, the distance from magnets to the mixing chamber will be determined empirically.

Generally, the magnitude of the gradient will depend on the difference in susceptibility between the two phases of the emulsion. A bench top demonstration determined that approximately a 1.5 cm distance between magnet pole and emulsion was sufficient to enhance phase separation. In either the dipolar or quadrupolar configurations, the magnets can be fixed to the exterior of the lumen 57 in a number of ways. Exemplary methods for permanently or removably attaching magnets to the exterior of the lumen include, but are not limited to, clamps, adhesive, welding, and collars that fit over the magnets and can be tightened to hold the magnets in place. Alternatively, magnets can be similarly positioned within the lumen (the mixing chamber) provided the magnet is coated with an inert material vis the components of the emulsion.

Generally, the feedstock or emulsified mixture flows through the lumen 56 and passes the magnets 12 so as to ultimately be downstream of the magnets. The emulsified mixture resides within the magnetic gradient area for a time sufficient to cause phases to separate from each other. Dwell time and gradient strength required to accelerate demulsification of an extraction emulsion involving paramagnetic metal ions differs based on the difference in magnetic susceptibilities of the phases. For example, in the example 1 below, sufficient dwell time was experimentally determined to be 10 seconds. In example 2 below, sufficient dwell time was determined to be 30 seconds. As such, the system is considered as continuous, with flow pressure and magnet spacing optimized, and fluid viscosity therefore adjusted to allow for optimal dwell times. In an embodiment of the invention, the fluid is constantly moving through the lumen. In other embodiments, the fluid flow is interrupted or slowed sufficiently to maximize de-emulsification, so as to be considered semi-continuous. Flow direction is designated with an arrow in FIG. 5. The magnetic field gradient created by the two magnets applies force to both of the two phases of the immiscible solvent feedstock.

The first phase 54 comprising the first solvent 51 solvating most or all of the paramagnetic metal ion 53 experiences force toward the magnets 12. The second phase 55 experiences force away from the magnets 12, FIG. 5 showing force with dashed arrows. With force applying to the first phase 54 toward the magnets 12 and force applying to the second phase 55 away from the magnets, large droplets of each phase will conglomerate as the immiscible feedstock solution flows through the lumen 56. With large drops of each solvent conglomerating while flowing through the lumen 56, the formation of a density gradient that would form naturally between the two phases is accelerated by the conglomeration of droplets while the feedstock is flowing. This accelerated formation of the density gradient causes the two phases to begin separating before exiting the lumen 56 and thus accelerates demulsification and phase disengagement.

The lumen can comprise any material. Exemplary materials include glass, polymers and metals, and may be transparent or opaque. Additionally, the lumen can be of any dimension depending on the scale of the application of the instant invention.

In another embodiment, the quadrupolar configuration 20 of the instant invention can be used on the exterior surface of the lumen 57 to create a stronger magnetic field gradient than that generated by the dipolar configuration 10. With the stronger magnetic field gradient, phase disengagement and demulsification of the two phases is further accelerated.

Figure 6:
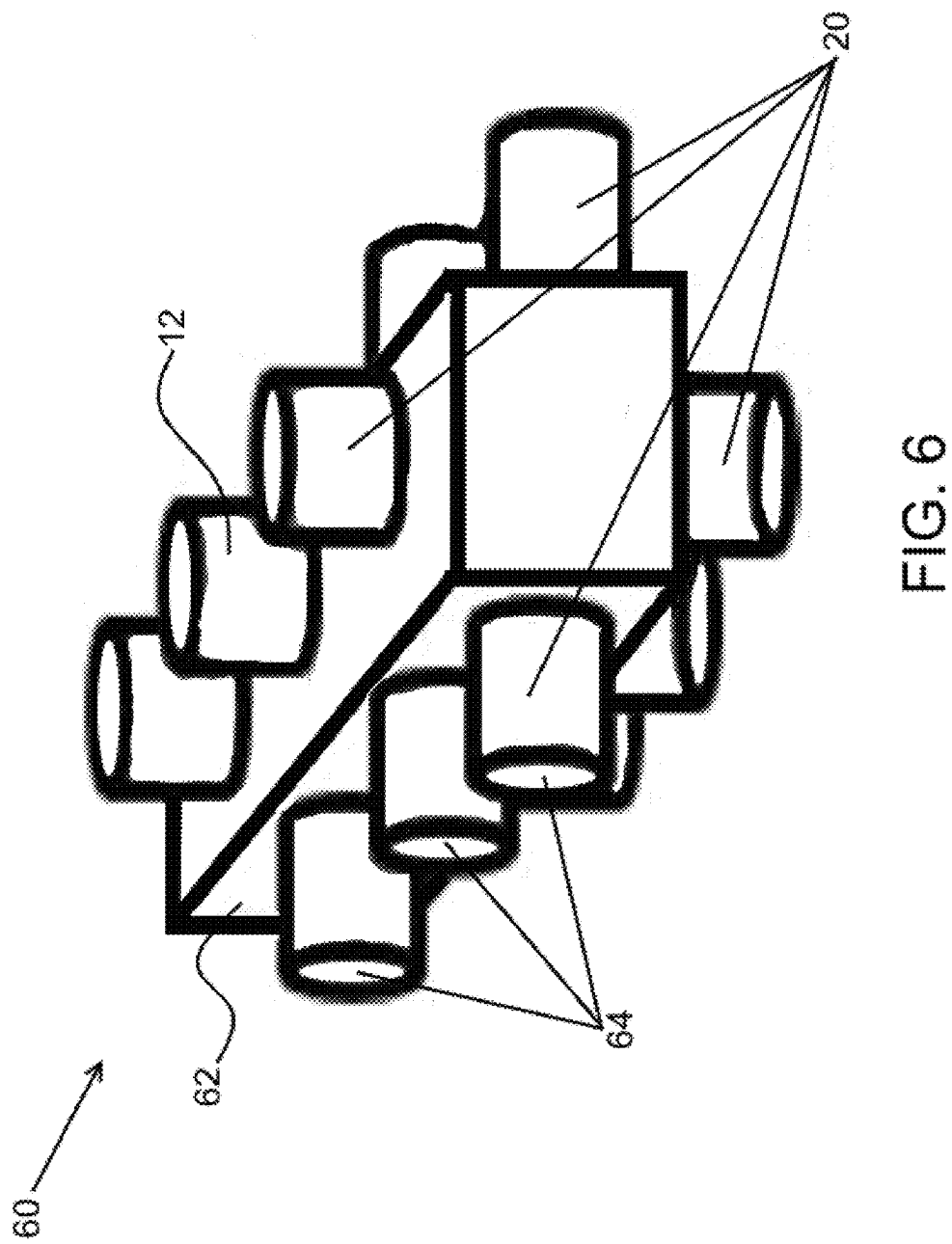
FIG. 6 depicts an extraction system using multiple rows of magnets to aid in demulsification; in accordance with the features of the invention.

FIG. 6 depicts an extraction system 60 having multiple rows of the quadrupolar configuration 20. The system 60 generally comprises a lumen 62 with multiple rows 64 of the quadrupolar configuration 20 affixed to the exterior surface of the lumen 62. Alternatively, the rows can comprise the dipolar embodiment of FIG. 1. All of the rows are equally spaced apart along the longitudinal axis of the lumen 62. Each of the quadrupolar rows 64 is oriented substantially the same around the longitudinal axis of the lumen 62 so that magnets 12 with their south pole facing the center of the tubing are coaxial with another magnet 12 with the south pole facing the center of the tubing along the longitudinal axis. The rows 64 can be any distance apart. In an exemplary embodiment, the rows are approximately one inch apart. There can be any number of rows. In an exemplary embodiment there are 30 rows per 30 linear inches of the lumen.

As discussed, supra, the force from the magnetic gradient from each quadrupolar configuration causes conglomeration of large droplets of each phase of a emulsion of immiscible solvents which in turn causes the phases to separate due to gravity. Additional rows 64 of quadrupolar configurations further accelerate the coalescence of larger droplets and thus further accelerate phase disengagement and demulsification. Generally, the rows of magnets are positioned from each other so that their forces do not interact, and the gradients they produce are not unintentionally affected by adjacently positioned rows.

Figure 7A:
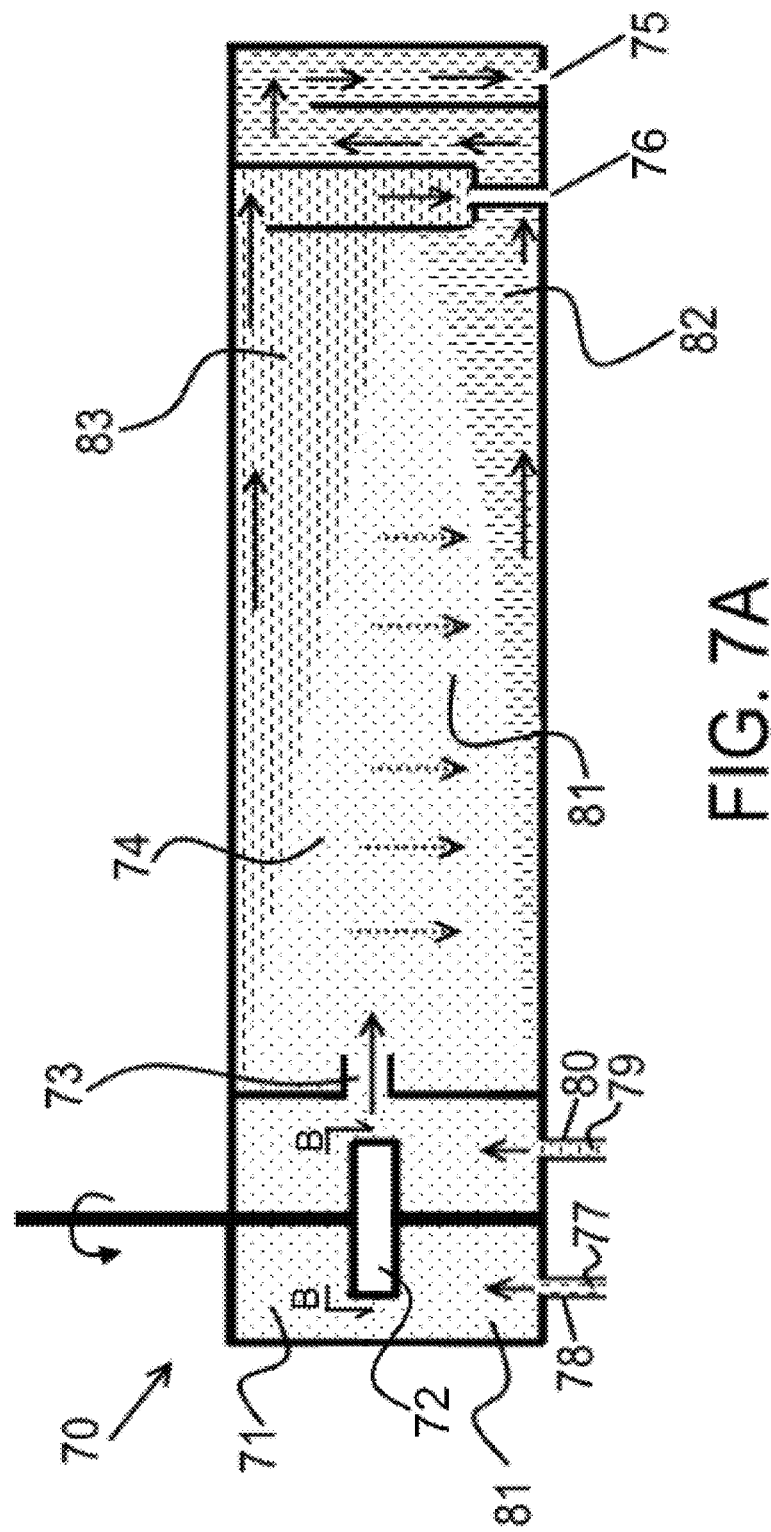
FIG. 7A is a sectional view of a mixer-settler device that uses a magnetic phase separation block for large scale solvent extractions; in accordance with the features of the invention.

FIG. 7A is a sectional view of a mixer-settler of the type used in commercial applications of solvent extraction adapted for use with the present invention. The mixer-settler 70 generally comprises a mixer compartment 71 having a first upstream end and a second downstream end. Proximal to the first end is a first fluid means of ingress 78 and a second means of ingress 80. Embodiments of these means of ingress include any conduit or passageway to establish fluid communication between the passageway and the interior regions of the Mixer-Settler. For example, means of ingress can include a conduit integrally molded with a region of the wall of the mixer-settler. Positioned within the compartment and downstream from the means of ingress 77 is an agitator 72. Positioned downstream from the agitator is a magnetic phase separator block 73, such that the agitator is between the first end of the compartment 71 and the separator block. Downstream of the separator block, the compartment forms, a settling compartment 74. Two means of egress are formed at the downstream (i.e. second end) of the mixer compartment: a first phase outlet 75 and a second phase outlet 76.

In operation, a first solution 77 comprising a first solvent containing a paramagnetic metal ion enters the mixer compartment through the ingress means 78. A second solution 79 comprising a second solvent wherein the second solvent has a higher affinity for the paramagnetic metal ion than the first solvent enters the mixer chamber through the second means of ingress 80. The second ingress means is positioned between the agitator and the agitator 72. (While FIG. 7A shows the first and second ingress means positioned on the same longitudinally extending side of the compartment 71, these two ingress means may be positioned on opposite sides so as to be laterally placed relative to the agitator which in this configuration would be positioned between the ingress means. The first and second solvents are immiscible. In the mixer compartment, the agitator 72 mixes the first 77 and second 79 solutions to substantial homogeneity to create an emulsion 81 which then flows through the magnetic phase separator block 73. Fluid flow is represented by solid arrows.

Figure 7B:
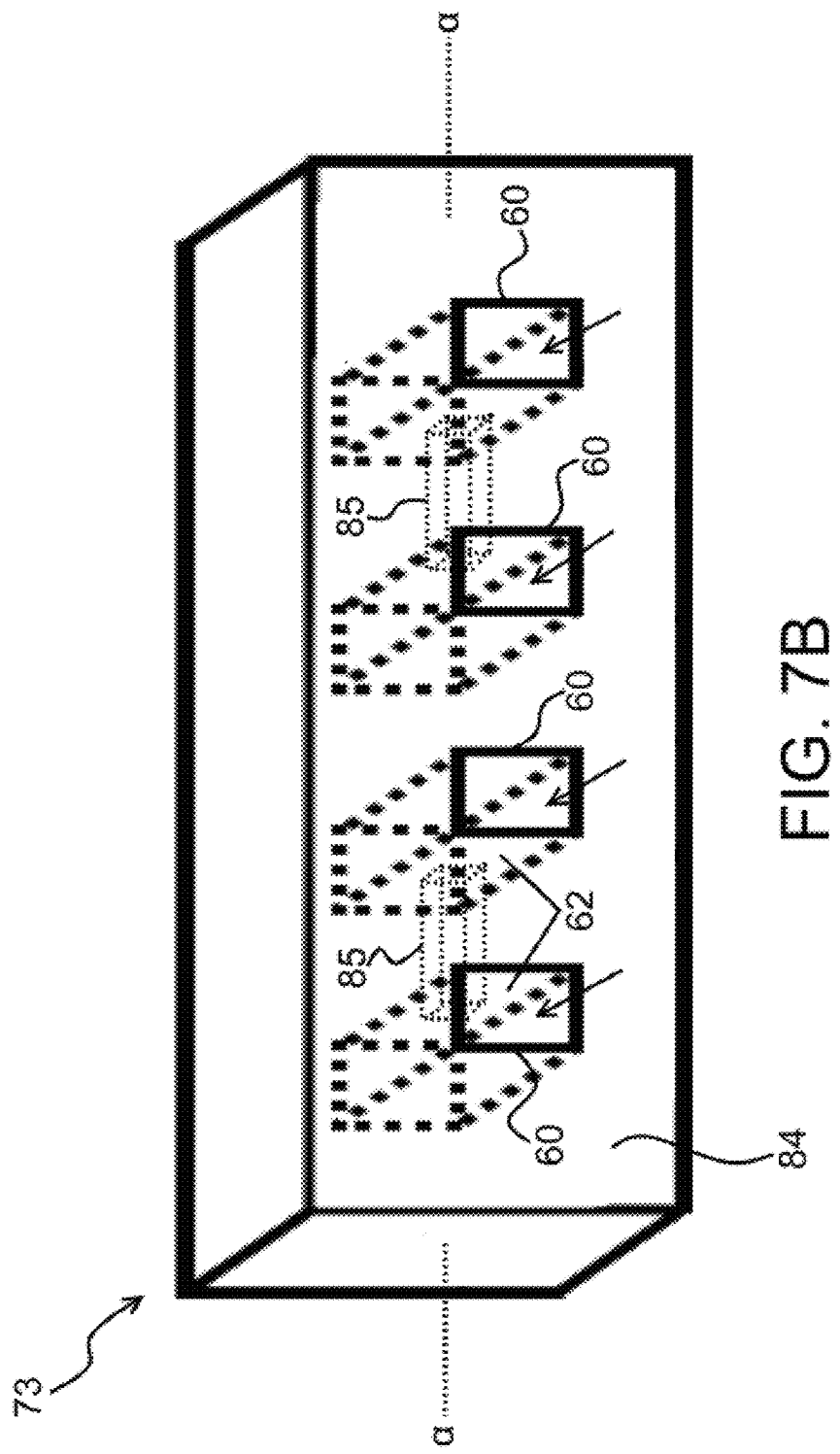
FIG. 7B is a detail view of the magnetic phase separation block, in accordance with the features of the invention.

FIG. 7B is a detail view of the magnetic separator block 73 of FIG. 7A taken along line B-B. The separator block 73 comprises a housing 84 containing a plurality of the extraction system 60 depicted in FIG. 6. In an embodiment, each extraction system 60 is spaced equally along the longitudinal axis a of the housing 84. In an embodiment, all extraction systems 60 run through the housing 84 at the same point of the housing's vertical axis and are substantially parallel to each other.

Each system 60 generally comprises a conduit, passageway or lumen 62 having multiple rows of the quadrupolar or dipolar configuration (shown in FIG. 7C, a detail view of an extraction system 60 in operation) of magnets affixed to longitudinally extending regions of the exterior surface of the lumen 62. Each of the rows of magnets is oriented substantially the same around the longitudinal axis of the lumen 62 so that magnets with their south pole facing the center of the tubing are coaxial with another magnet with the south pole facing the center of the tubing along the longitudinal axis. All of the rows are equally spaced apart along the longitudinal axis of the lumen 62.

In another embodiment, the extraction systems 60 are in fluid communication with adjacent extraction systems 60 through a secondary lumen 85 allowing flow between the lumens 62 of the adjacent systems 60. The number of extraction systems 60 held in the housing 84 can be any number and can be determined by the scale of the extraction taking place in the Mixer-Settler 70 of FIG. 7A. All of the emulsion 81 of FIG. 7A that flows through the magnetic separator block flows through the lumens 62 of the extraction systems. The extraction systems 60 accelerate the demulsification and phase separation of the emulsion 81, accelerating the extraction performed in the Mixer-Settler 70 when compared with conventional Mixer-Settlers that do not have magnetic separator blocks. Without magnetic separator blocks, the emulsion 81 of FIG. 7A takes more or infinite time to separate and decreases the efficiency of the extraction using the Mixer-Settler.

Emulsion 81 flows from the mixer compartment through the lumens 62 of the extraction systems 60 of the separator block 73. Flow is represented using solid arrows in FIGS. 7B-C. As emulsion flows through the lumens 62 of the extraction systems, the magnetic field gradients generated by each row of magnets applies force to the phases within the emulsion as discussed above. As a result of the applied forces, the magnetic separator block 73 accelerates demulsification of the emulsion. As a result of the accelerated demulsification provided, the phases of the emulsion 81 begin to reestablish before the emulsion exits the separator block 73. The phase reestablishment is shown in FIG. 7C, which is a detail view of an extraction system 60 in operation.

Reestablishment of phases before exiting the separator block increases the overall efficiency of the underlying extraction, thereby reducing the time required between inputting feedstock and harvesting pure phases. This increase in efficiency is such that the number of mixer-settlers used in extractions that subject the same feedstock solution to multiple mixer-settlers can be reduced or limited to one through use of the instant magnetic separator block. Reducing the number of mixer-settlers required to complete an extraction on a commercial scale makes an underlying extraction more time efficient and reduces cost.

Figure 7C:
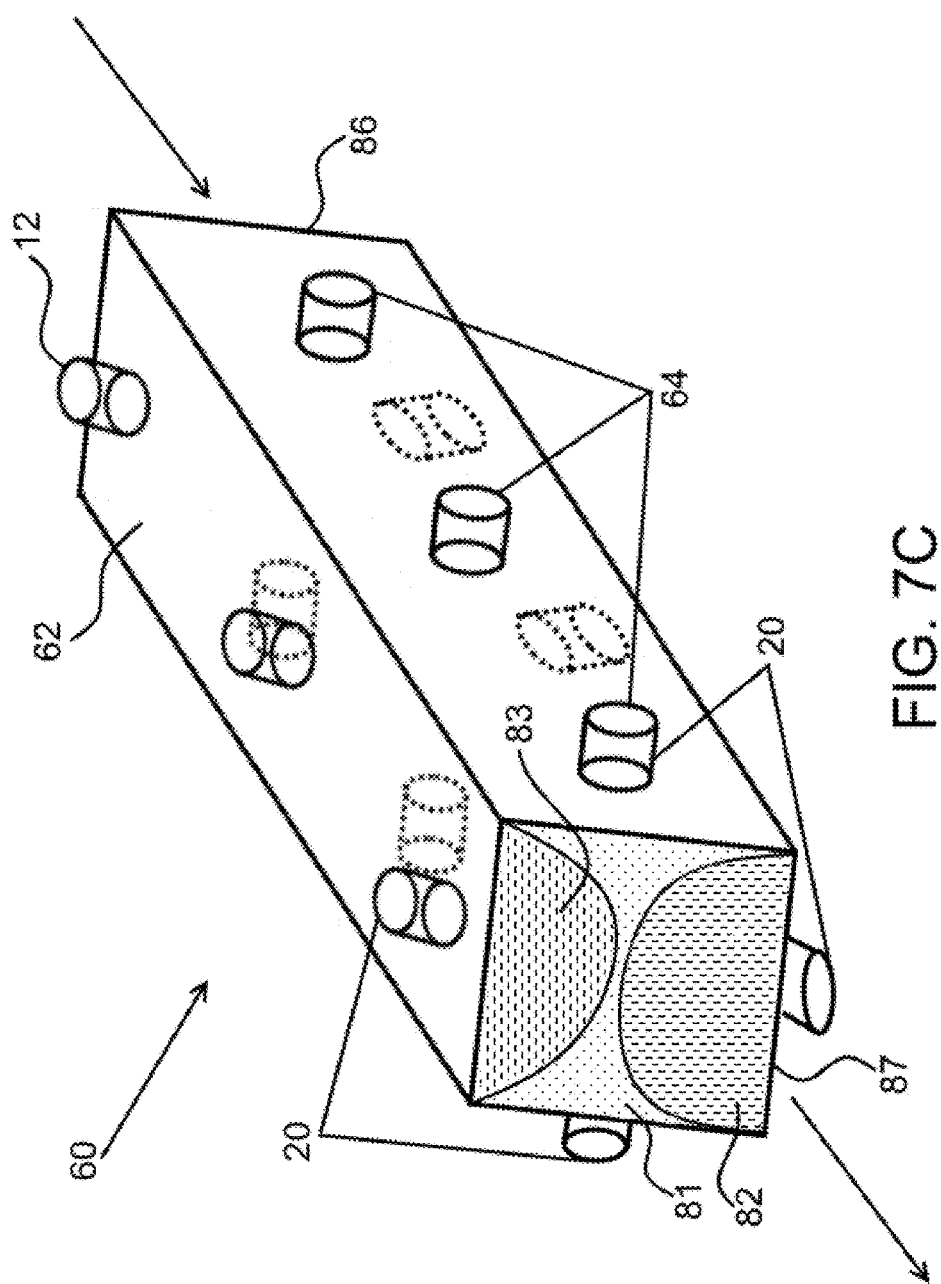
FIG. 7C is a detail view of an extraction system within the magnetic phase separation block, in accordance with the features of the invention.

FIG. 7C is a detail view of an extraction system 60 of FIGS. 7A and B in operation. Emulsion leaving the mixing compartment 71 of FIG. 7B flows into the upstream (i.e., proximal) end 86 of an extraction system 60. Flow is designated with solid arrows. As shown in FIG. 7C, there are rows 64 of the quadrupolar configuration 20 of magnets 12 affixed to the exterior surface of the lumen 62. Each row 64 of magnets 12 is oriented substantially the same around the longitudinal axis of the lumen 62 so that magnets 12 with their south pole facing the center of the lumen 62 are coaxial with another magnet 12 with the south pole facing the center of the lumen 62 along the longitudinal axis. Magnets 12 with their north pole facing the center of the lumen 62 are coaxial with another magnet 12 with the north pole facing the center of the lumen along the longitudinal axis. All of the rows are equally spaced apart along the longitudinal axis of the lumen 62.

Each row 64 of the quadrupolar 20 configuration creates a magnetic field gradient that applies force as described above to the two phases of the emulsion 81 flowing by, accelerating demulsification and phase disengagement of the emulsion 81. When the feedstock solution reaches the downstream (i.e., distal) end 87 of the extraction system 60, the two phases of the emulsion 81 have begun to reestablish such that effluent leaving the distal end 87 of the extraction system 60 comprises a pure first phase 82, a pure second phase 83, and leftover, unseparated emulsion 81.

Returning to FIG. 7A, upon exiting the magnetic phase separator block 73, the denser of the first and second solvents settles to the bottom of the settler compartment 74 due to gravity (represented by dashed arrows) as a first phase 82 and exits the Mixer-Settler 70 through the first phase outlet 75. The relatively less dense of the two solvents rises to the top of the settler compartment 74 as a second phase 83 and exits through the second phase outlet 76. Leftover emulsion 81 continues to separate into the two phases which exit the Mixer-Settler 70 through their respective outlets.

FIG. 8 depicts an alternate embodiment of the magnetic separator block of FIG. 7. In this embodiment, the magnetic separator 100 generally comprises a substrate 102 having apertures 104 spaced evenly throughout the substrate 102 to form a mesh 106. A plurality of first magnets 12*a* are fixed to the substrate 102 opposite each other across each aperture 104 such that each of the first magnets 12*a* is positioned an equal distance from a center point 106 of an aperture 104 as another first magnet 12*a*. Each of the first magnets 12*a* are fixed in position so that like poles face the center of the apertures 104 and the faces 18 of the magnets 12*a* are substantially parallel. A plurality of second magnets 12*b* are fixed to the substrate 102 opposite each other across each aperture 104 such that each of the second magnets 12*b* is positioned an equal distance from a center point 106 of an aperture 104 as another second magnet 12*b*. Each of the second magnets 12*b* are fixed in position so that like poles face the center of the apertures 104 and the faces 18 of the magnets 12*b* are substantially parallel. Second pairs of magnets 12*b* are fixed to the substrate 102 such that each second pair of magnets 12*b* is in the same plane as and substantially perpendicular to the first pair of magnets 12*a*. Using the mesh configuration allows for high throughput without adding significant back pressure.

Magnet Detail

Magnetic field gradients suitable for use in this invention allow droplets of each phase to coalesce without clogging or otherwise narrowing the fluid passageway through which the separated products traverse. Clogging or narrowing of the passageways will be evident if during initial construction, the required fluid flow is not occurring. As discussed supra, magnets must be space apart enough to maintain a predetermined fluid flow, but close enough to enhance each other's magnetic fields to create stronger gradients. Distances between about 1 mm and about 25 mm are suitable.

The stronger the magnet the better, such that an upper limit is not an issue. Depending on the spacing between the magnets, magnets of strength above 0.1 T should be useful provided the separation between magnets is narrow enough to give high gradients (e.g., about 1 mm for 0.1 T magnets). Magnets with a strength above about 0.3 T are preferable. Currently, low cost magnets of 0.5 T are available that give much enhanced phase separation at a spacing of about 1 cm and these are suitable for the invention. As stronger permanent magnets become available and affordable in terms of monetary cost, such magnets will also be suitable.

In configurations wherein all positive poles (or negative poles) are opposed to each other, generating suitable gradients is assured by the distance between the centers of opposing magnets. For instance, where magnets having strength of 0.1 T oppose each other with the same pole, a distance of 1 mm between the centers of the magnets assures a sufficient magnetic field gradient for use in the instant invention.

Where magnets having strength of 0.5 T oppose each other with the same pole, a distance of 2.5 cm between the centers of the magnets assures a sufficient magnetic field gradient for use in the instant invention.

The following examples utilize the above magnet placement parameters. However, other configurations and protocols, empirically determined, can also use these parameters.

EXAMPLE 1

Depending on the solvents used and the paramagnetic metal ion being extracted, phase disengagement is accelerated two-fold or more compared to if no magnetic field gradient is imposed.

In an embodiment of the invention, chemical extraction of metal ions is allowed to begin prior to application of a magnetic field gradient. In this embodiment, the use of electromagnets may be suitable so as to cycle on and off the magnetic field gradient and vary the field strength.

In another embodiment of the invention, chemical extraction of metal moieties is initiated in a reaction environment already subjected to a continuous magnetic field. For example, in an always on magnetic field environment, demulsification of an extraction emulsion comprising an aqueous solution of 0.5 M $Gd(NO_3)_3$ and 3M $LiNO_3$ and an organic phase of tri-n-butyl phosphate can be completed in about 60 seconds. Demulsification of the same extraction took 150 seconds to complete without the presence of a magnetic field.

Figure 9A:
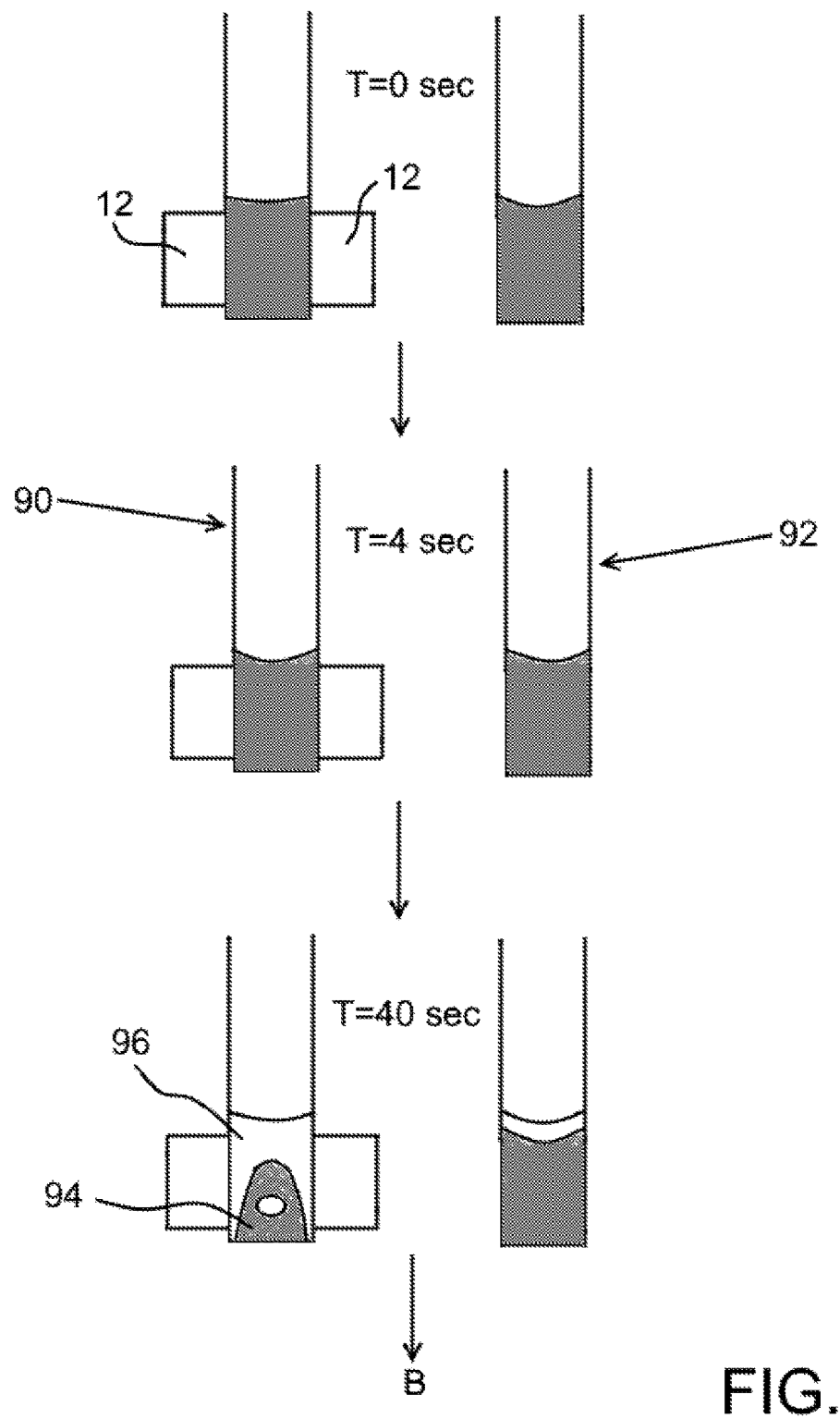
FIGS. 9A and 9B show photos of demulsification of two extractions of Gd(III), one using the instant invention and one not, over time, in accordance with the features of the invention.
Figure 9B:
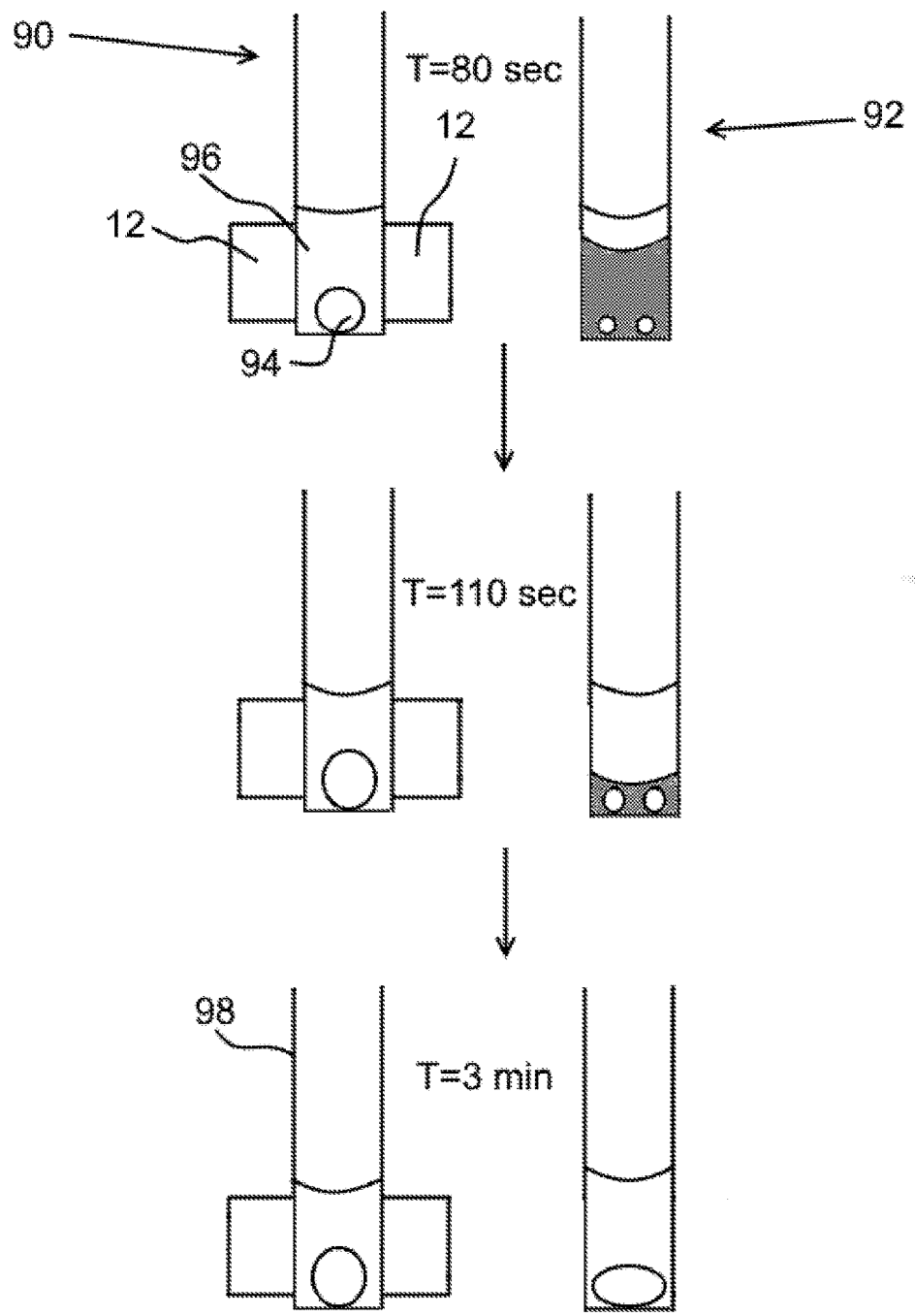

FIGS. 9A-9B are a series of illustrations depicting the results of an extraction 90 of the Gd(III) from the Gd(NO$_3$)$_3$ LiNO$_3$ solution above as it demulsifies over time using the dipolar configuration of the instant invention alongside a control extraction 92 not using the instant invention. FIG. 9A includes illustrations of the extraction at 0 seconds, 4 seconds and 40 seconds with FIG. 9B showing the extractions at 80 seconds, 110 seconds, and 180 seconds. Each illustration of FIGS. 9A-B shows the progress of demulsification of the extraction 90 and control extraction 92 at the same time.

In the extraction 90 and control extraction 92, the aqueous solution 94 of 0.5 M Gd(NO$_3$)$_3$ and 3M LiNO$_3$ is emulsified with an aqueous-immiscible organic phase 96 of tri-n-butyl phosphate where the ratio of organic phase to aqueous phase is approximately 4:1. (Ratios of between about 1:1 to 10:1 are suitable.) After the phases are agitated to form an emulsion, the Gd(III) partitions mostly to the organic phase 96. The presence of four times the volume of the organic phase 96 compared to the aqueous phase 94 causes drops of the aqueous phase to disperse into the continuous organic phase 96. As the continuous organic phase 96 has a higher concentration of the paramagnetic Gd(III) ion, and is therefore more paramagnetic than the aqueous phase 94, the organic phase 96 experiences force from the magnetic field gradient generated by the magnets 12 toward the magnets.

In FIGS. 9A-B, the attraction of the relatively clear organic phase 96 is illustrated in the illustrations beginning at T=40 sec through T=3 min as the organic phase 96 gathers close to the magnets 12. The dispersed aqueous phase 94 contains less Gd(III) ions than the organic phase 96 and is therefore less paramagnetic. As a result of the aqueous phase's lower concentration of paramagnetic Gd(III) ions, the aqueous phase 94 experiences force from the magnetic field gradient generated by the magnets 12 that forces aqueous phase droplets away from the magnets and towards the middle- and bottom-center of the reaction chamber as a consequence of the combination of magnetic force and gravity. With the force on the aqueous phase 92 pushing droplets of the aqueous phase into a space between the magnets 12, the droplets of the aqueous phase 92 coalesce into larger droplets and separate from the organic phase due to gravity. In FIG. 9a, the force on the aqueous phase 92 is evidenced by the aqueous phase 92 collecting in the middle of the extraction lumen 98. The illustrations at T=40 sec through T=3 min of FIGS. 9A-B illustrate the repulsion of the aqueous phase 94 as the aqueous phase 94 is forced away from the magnets 12 into the space between the magnets 12. Also illustrated in FIG. 9 B is the failure of the control extraction 92 to demulsify at T=3 min where the extraction 90 using the instant invention had completely demulsified by at most T=80 sec.

EXAMPLE 2

When an organic phase of the Gd(III) extraction was stripped in the presence of a magnetic field, demulsification took only 10 seconds compared to a demulsification time of 240 seconds when a magnetic field is not present. This represents a 24-fold acceleration of demulsification. Using the instant invention, complete demulsification can occur in extractions that would otherwise result in indefinite phase entrainment without intervention.

Figure 10A:
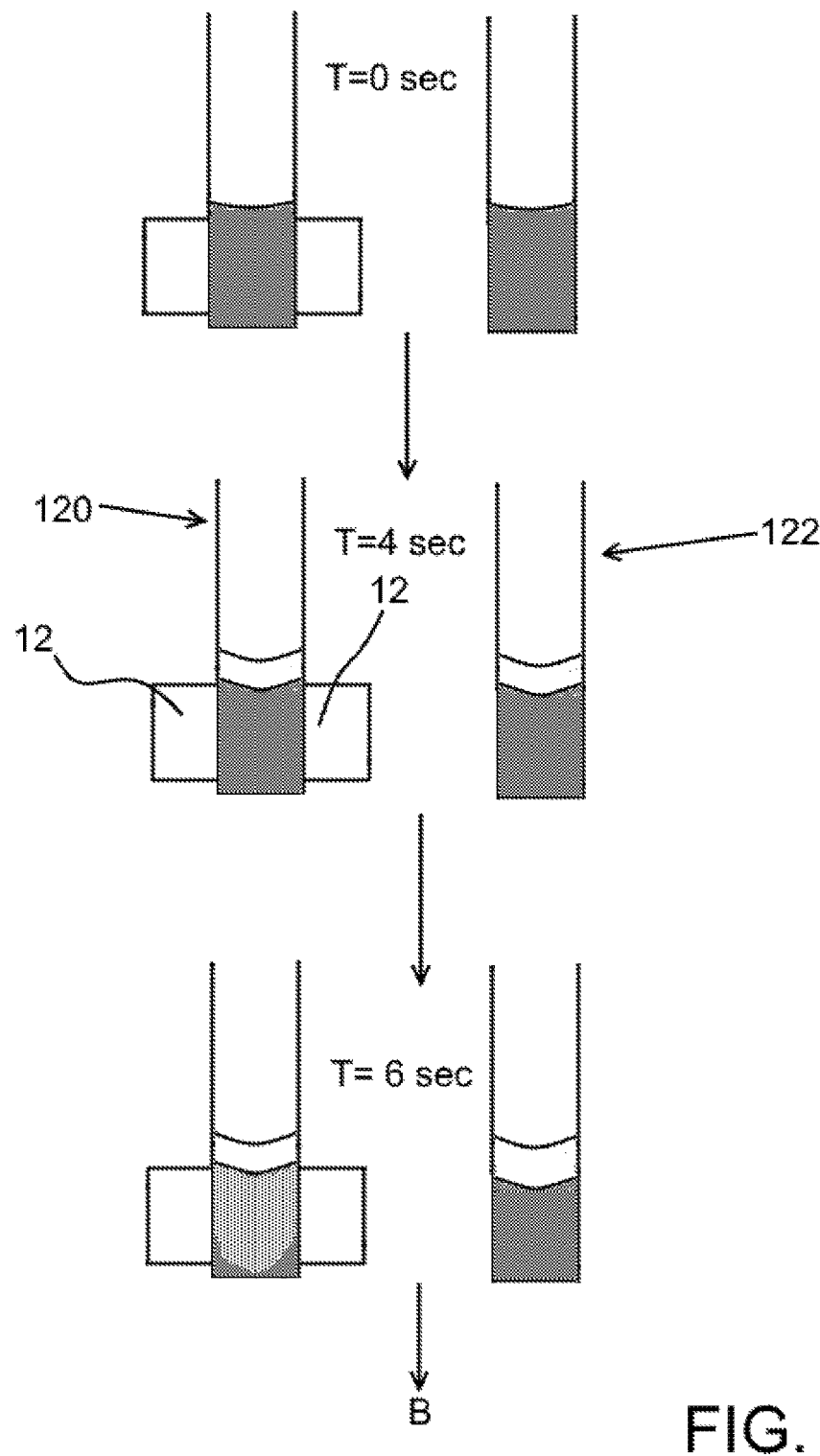
FIGS. 10A and 10B show photos of demulsification of two strippings of Gd(III), one using the instant invention and one not, over time, in accordance with the features of the invention.
Figure 10B:
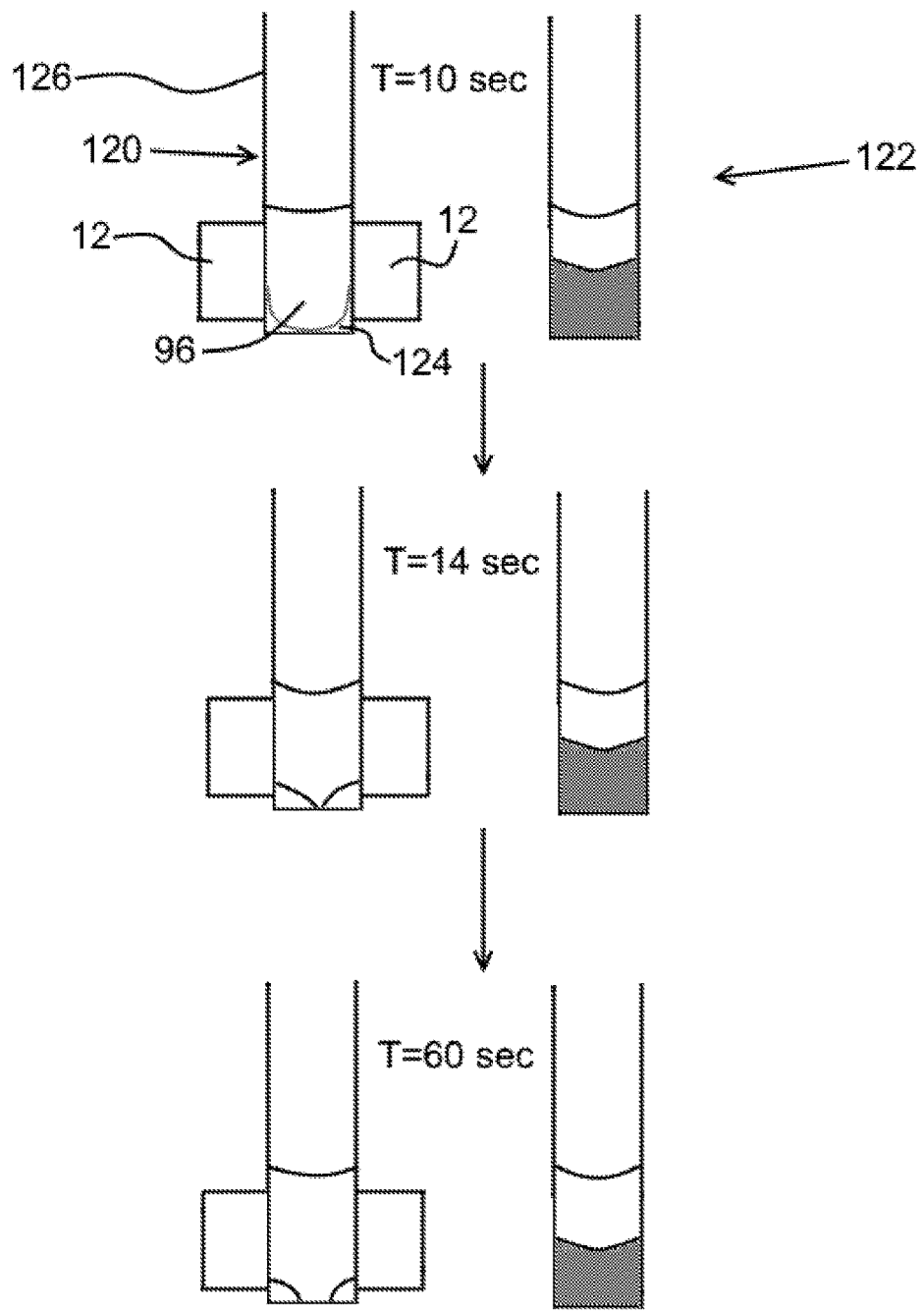

FIGS. 10A-B are a series of illustrations depicting the results of the stripping 120 of Gd(III) from the organic phase 96 of FIGS. 9A-B and the example above using the dipolar configuration of the instant invention. Also shown in each of the illustrations of FIGS. 10A-B is a control stripping of 122 Gd(III) from the organic phase 96 of FIGS. 9A-B and the example above without use of the instant invention. FIG. 10A includes illustrations of the stripping at 0 seconds, 4 seconds and 6 seconds with FIG. 10B showing the stripping at 10 seconds, 14 seconds, and 60 seconds. Each illustration of FIGS. 10A-B shows the progress of demulsification of the stripping 120 and control stripping 122 at the same time.

In this stripping, the organic phase 96 of FIGS. 9A-B, tri-n-butyl phosphate solvating Gd(III) ions, contacts a clean aqueous phase 124 (shown in FIG. 10 B) of 0.01 M HNO$_3$, where the ratio of organic phase to aqueous phase is approximately 4:1. After the phases are agitated to form an emulsion, the Gd(III) partitions mostly to the clean aqueous phase 124. The presence of four times the volume of the organic phase 96 compared to the aqueous phase 104 causes drops of the aqueous phase 124 to disperse in a continuous organic phase 96. As the dispersed aqueous phase 124 has a higher concentration of the paramagnetic Gd(III) ion, and is therefore more paramagnetic than the organic phase 96, the aqueous phase 124 experiences force from the magnetic field gradient generated by the magnets 12 toward the magnets.

In FIGS. 10A-B, the attraction of the aqueous phase 106 can clearly be seen in the illustrations between T=6 sec and T=10 sec as the aqueous phase 124 gathers close to the magnets 12. The dispersed organic phase 96 contains less Gd(III) ions than the aqueous phase 104 and is therefore less paramagnetic. As a result of the organic phase's lower concentration of paramagnetic Gd(III) ions, the organic phase 96 experiences force from the magnetic field gradient generated by the magnets 12 that forces organic phase droplets away from the magnets. With the force on the organic phase 96 pushing droplets of the organic phase 96 into a space between the magnets 12, the droplets of the organic phase 96 coalesce into larger droplets and separate from the aqueous phase 124 due to gravity. The force on the organic phase 96 is shown by the organic phase 96 collecting in the middle of the extraction lumen 126 and illustrated best in the illustration at T=10 sec of FIG. 10B. Also illustrated in FIG. 10 B is the failure of the control stripping 122 to demulsify at T=60 sec where the stripping 100 using the instant invention had demulsified at T=10 sec.

In summary, the invention provides accelerated demulsification and phase disengagement in extraction mixtures from feedstock material supplied as immiscible mixtures of aqueous solutions, organic solutions, liquids, or combinations thereof. As such, the invention facilitates the demulsification and phase disengagement of extraction mixtures from immiscible, liquid phase feedstocks. An embodiment of the invented method uses no solid materials such as metal particles, magnetic particles or other solid phase substrates. Conversely, metal ions in solution can and are used extensively in various separation methods and systems described herein. In an embodiment, extraction phases are added neat to the modality or vessel where the extraction takes place.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

Embodiments of the invention enable acceleration of demulsification and phase disengagement of any solvent extraction system involving the uneven partitioning of paramagnetic metal ions between phases. The vast majority of industrial solvent extraction systems will either target a desired paramagnetic metal ion for extraction, or unwanted paramagnetic metal ions in the feed solution. Examples of paramagnetic metal ions that are frequently encountered in solvent extraction systems used in metal refining are Fe(III), Gd(III), Dy(III), Cu(II), Ir(III), Rh(III), Mn(III), however many more persist. High likelihood of high concentration of paramagnetic metal ions in solvent extraction processes makes the technology universally applicable to the refining of precious metals, base metals and rare earth metals. Still yet another embodiment accelerates phase disengagement of extractions of uranium and transuranic elements from nuclear waste, which contains high concentrations of paramagnetic metal ions such as Pu(III/IV) and other fission products (e.g. Dy(III), Gd(III), etc.).

The instant invention provides a device that can be used in conjunction with standard equipment used in the separation of paramagnetic moieties from solution comprising a mixing chamber; the chamber defined by a floor, a ceiling above the floor, walls disposed between the floor and the ceiling, an agitator attached to one of said floor, ceiling, or walls via an attachment, said attachment allowing for rotation of the said agitator, and two solution inlets within one of said floor, ceiling, or walls, said inlets allowing for entry of liquid-phase feedstock into the mixing chamber; a magnetic separation block in fluid communication with the mixing chamber, wherein the magnetic separation block comprises a housing holding a plurality of lumens; and wherein at least one pair of magnets is fixed to opposing sides of the exterior surface of each lumen at substantially the same point along the lumen and wherein the magnets face the interior of the lumen with the same magnetic pole; and a settling chamber in fluid communication with the magnetic separation block; the settling chamber defined by a floor, a ceiling above the floor, walls disposed between the floor and the ceiling, a first solution outlet within one of said ceiling or walls and a second solution outlet within one of said walls or floor. In said device, the at least one pair of magnets is a plurality of pairs of magnets equally spaced along the length of each lumen; and wherein each pair of magnets is fixed on opposing sides of the exterior surface of each lumen at substantially the same point along the lumen; and wherein each pair of magnets faces the interior of the lumen with the same magnetic pole. Said device further comprises at least one second pair of magnets on opposing sides of the exterior surface of each lumen 90 degrees from the opposing sides having the at least one first pair of magnets wherein the at least one second pair of magnets are both positioned at substantially the same point lumen's longitudinal axis as the at least one first pair of magnets and wherein the at least one second pair of magnets are substantially perpendicular to the at least one first pair of magnets, and face the interior of the lumen with the magnetic pole opposite to the magnetic pole of the at least one first pair of magnets facing the interior of the lumen. In said device, the at least one first pair of magnets and at least one second pair of magnets is a plurality of first and second pairs of magnets equally spaced along the length of each lumen's longitudinal axis.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for magnetically assisting demulsification of extraction phases, the method comprising:
   a) contacting a first solution comprising a first solvent and a solvated paramagnetic metal ion with a second solvent, wherein the second solvent is immiscible with the first solvent;

b) mixing the first solution and second solvent to create an emulsion having a first phase comprising the first solvent and second phase comprising the second solvent, wherein the emulsion comprises droplets of the first phase dispersed in the second phase, and wherein the first and second phases of the emulsion contain different concentrations of said paramagnetic metal ion; and c) applying a magnetic field gradient to the first and second phases of the emulsion for a time and at a magnetic gradient strength sufficient to force the droplets of the first phase to coalesce into larger droplets, thereby accelerating separation of the first phase from the second phase, wherein the method is performed without adding solid particles to the first solution or second solvent.

2. The method of claim 1 wherein the magnetic field gradient applies force to the first phase of the emulsion in a first direction and applies force to the second phase of the emulsion in a second direction wherein the second direction is substantially opposite to the first direction.

3. The method of claim 1 wherein the paramagnetic metal ion comprises a moiety with a magnetic permeability of greater than 1.

4. The method of claim 1 wherein the paramagnetic metal ion further is a metal ion.

5. The method of claim 1 wherein the steps occur in a lumen having an interior and exterior surface and a longitudinal axis along the lumen's length and wherein the step of applying a magnetic field gradient to the emulsion further comprises fixing at least one pair of magnets on opposing sides of the exterior surface of the lumen at substantially the same point along the lumen's longitudinal axis and wherein the magnets are substantially parallel and face the interior of the lumen with the same magnetic pole.

6. The method of claim 5 wherein the at least one pair of magnets is a plurality of pairs of magnets equally spaced along the length of the lumen's longitudinal axis wherein each pair of magnets is fixed on opposing sides of the exterior surface of the lumen at substantially the same point along the lumen's longitudinal axis and wherein each pair of the magnets are substantially parallel, and face the interior of the lumen with the same magnetic pole.

7. The method of claim 1 wherein the steps occur in a lumen having an interior and exterior surface and wherein the step of applying a magnetic field to the emulsion further comprises:

a) fixing at least one first pair of magnets on opposing sides of the exterior surface of the lumen wherein the at least one first pair of magnets are both positioned at substantially the same point along the lumen's longitudinal axis and wherein the magnets are parallel, and face the interior of the lumen with the same magnetic pole; and b) fixing at least one second pair of magnets on opposing sides of the exterior surface of the lumen 90 degrees from the opposing sides having the at least one first pair of magnets wherein the at least one second pair of magnets are both positioned at substantially the same point along the lumen's longitudinal axis as the at least one first pair of magnets and wherein the at least one second pair of magnets are substantially perpendicular to the at least one first pair of magnets, and face the interior of the lumen with the magnetic pole opposite to the magnetic pole of the at least one first pair of magnets facing the interior of the lumen.

8. The method of claim 7 wherein the at least one first pair of magnets and at least one second pair of magnets is a plurality of first and second pairs of magnets equally spaced along the length of the lumen's longitudinal axis.

9. The method of claim 5 wherein each magnet of the at least one pair of magnets has a strength from about 0.1 T to about 1 T.

10. The method of claim 7 wherein each magnet of the at least one first pair of magnets and each magnet of the at least second pair of magnets has a strength from about 0.1 T to about 1 T.

11. The method of claim 5 wherein the magnetic gradient strength sufficient to accelerate separation of the first phase from the second phase is created when each of the at least one pair of magnets has a bottom surface that contacts the exterior surface of the lumen wherein the bottom surface of each of the at least one pair of magnets has a center point and wherein each of the at least one pair of magnets has a strength of about 0.1 T and the centers of the magnets are separated by about 1 mm or wherein each of the at least one pair of magnets has a strength of about 0.5 T and the centers of those magnets are separated by about 2.5 cm.

12. The method of claim 1 wherein no solid magnetic particles are added.

13. The method of claim 1 wherein no solid nonmetallic particles are added.

14. The method of claim 1 wherein no additional substances are added to the first solution or second solvent that are mixed to form an emulsion.

15. The method of claim 1 further comprising:

a) contacting the second phase with a third phase, wherein the third phase has a higher affinity for the paramagnetic metal ion than the second solvent, and wherein the third phase is immiscible with the second solvent;

b) mixing the second phase with the third phase to create a stripping emulsion, wherein the emulsion comprises droplets of the second phase dispersed in the third phase, and wherein the second phase and third phase comprising the emulsion contain different concentrations of said paramagnetic metal ion; and c) applying a magnetic field gradient to stripping emulsion for a time and at a magnetic gradient strength sufficient to force the droplets of the second phase to coalesce into larger droplets, thereby accelerating separation of the second phase from the third phase, wherein the method is performed without adding solid particles to the second phase or third phase.

16. The method of claim 1 wherein the paramagnetic ion is an ion selected from the group consisting of Fe(III), Gd(III), Dy(III), Cu(II), Ir(III), Rh(III), Mn(III), Pu(III), Pu(IV), and combinations thereof.

17. The method of claim 1 wherein the first solution is an aqueous solution of 0.5 M $Gd(NO_3)_3$ and 3 M $LiNO_3$, and wherein the second solvent is tri-n-butyl phosphate.

* * * * *